US012468303B2

(12) United States Patent
Kitai et al.

(10) Patent No.: US 12,468,303 B2
(45) Date of Patent: Nov. 11, 2025

(54) WORK MACHINES

(71) Applicant: HITACHI CONSTRUCTION MACHINERY CO., LTD., Tokyo (JP)

(72) Inventors: Sasuga Kitai, Tokyo (JP); Mikio Bando, Tokyo (JP); Takehito Ogata, Tokyo (JP); Shinichi Uotsu, Ibaraki (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 172 days.

(21) Appl. No.: 18/019,492

(22) PCT Filed: May 13, 2021

(86) PCT No.: PCT/JP2021/018284
§ 371 (c)(1),
(2) Date: Feb. 3, 2023

(87) PCT Pub. No.: WO2022/049836
PCT Pub. Date: Mar. 10, 2022

(65) Prior Publication Data
US 2023/0324917 A1    Oct. 12, 2023

(30) Foreign Application Priority Data

Sep. 7, 2020    (JP) .................... 2020-149868

(51) Int. Cl.
*G05D 1/00*    (2024.01)
*G01B 11/14*    (2006.01)

(52) U.S. Cl.
CPC ........... *G05D 1/0231* (2013.01); *G01B 11/14* (2013.01)

(58) Field of Classification Search
CPC ...... G05D 1/0231; G05D 1/024; G01B 11/14; G06V 20/56; G06V 20/64; G01S 7/003;
(Continued)

(56) References Cited

U.S. PATENT DOCUMENTS

2016/0252617 A1* 9/2016 Tehrani Niknejad ........................
G01S 7/4808
356/5.01
2017/0018188 A1* 1/2017 Ono ........................ G05D 1/024
(Continued)

FOREIGN PATENT DOCUMENTS

JP    10-153661 A    6/1998
JP    2019-012063 A    1/2019
(Continued)

OTHER PUBLICATIONS

Extended European Search Report received in corresponding European Application No. 21863895.5 dated Jun. 25, 2024.
(Continued)

*Primary Examiner* — Abdalla A Khaled
(74) *Attorney, Agent, or Firm* — Mattingly & Malur, PC

(57) ABSTRACT

A measurement sensor that measures, as three-dimensional point cloud information having a plurality of vertically-adjacent layers, a surface position of an object around the work machine; and an object sensor that senses an object around the work machine on a basis of information from the measurement sensor are included, and the object sensor acquires three-dimensional point cloud information by measurement by the measurement sensor; senses, as point data, a point where microparticles are measured, based on a relation between distances, from the measurement sensor, of point data of vertically-adjacent layers and variations of distance differences, regarding a plurality of pieces of point data included in the three-dimensional point cloud information; deletes the point data of the point sensed as the point where the microparticles are measured, from the three-dimensional point cloud information; and senses an object around the work machine on a basis of the three-dimensional point cloud information.

4 Claims, 15 Drawing Sheets

(58) Field of Classification Search
CPC ........ G01S 7/4808; G01S 17/42; G01S 17/86;
G01S 17/931
See application file for complete search history.

(56) References Cited

U.S. PATENT DOCUMENTS

| | | | |
|---|---|---|---|
| 2017/0023473 A1* | 1/2017 | Wegner | G06T 7/11 |
| 2019/0056504 A1* | 2/2019 | Hartman | G01S 17/89 |
| 2020/0379096 A1* | 12/2020 | Zhou | G01N 21/55 |
| 2020/0391767 A1* | 12/2020 | Tanaka | G08G 1/017 |
| 2021/0122364 A1* | 4/2021 | Lee | G06F 18/2413 |
| 2021/0256718 A1* | 8/2021 | Gangundi | G06V 10/82 |
| 2021/0263154 A1* | 8/2021 | Herman | G01S 17/26 |
| 2021/0364639 A1* | 11/2021 | Baeg | G01S 17/89 |
| 2022/0012505 A1* | 1/2022 | Kato | G06V 20/58 |
| 2022/0383749 A1* | 12/2022 | Ishikawa | G06V 20/70 |

FOREIGN PATENT DOCUMENTS

| | | |
|---|---|---|
| JP | 2019-105654 A | 6/2019 |
| JP | 2019-179512 A | 10/2019 |
| JP | 2020-125031 A | 8/2020 |

OTHER PUBLICATIONS

International Preliminary Report on Patentability received in corresponding International Application No. PCT/JP2021/018284 dated Mar. 16, 2023.
International Search Report of PCT/JP2021/018284 dated Aug. 10, 2021.

* cited by examiner

FIG. 3

| DATA ID | HORIZONTAL MEASUREMENT ANGLE | VERTICAL MEASUREMENT ANGLE | MEASUREMENT DISTANCE | THREE-DIMENSIONAL COORDINATES | MICROPARTICLE LABEL |
|---|---|---|---|---|---|
| 1 | $\Theta_1$ | $\phi_1$ | $L_{1,1}$ | $(X_{1,1}, Y_{1,1}, Z_{1,1})$ | 0 |
| 2 | $\Theta_1$ | $\phi_1$ | $L_{1,2}$ | $(X_{1,2}, Y_{1,2}, Z_{1,2})$ | 1 |
| ⋮ | ⋮ | ⋮ | ⋮ | ⋮ | ⋮ |
| M | $\Theta_1$ | $\phi_M$ | $L_{1,M}$ | $(X_{1,M}, Y_{1,M}, Z_{1,M})$ | 1 |
| M+1 | $\Theta_2$ | $\phi_1$ | $L_{2,1}$ | $(X_{2,1}, Y_{2,1}, Z_{2,1})$ | 0 |
| ⋮ | ⋮ | ⋮ | ⋮ | ⋮ | ⋮ |
| 2M | $\Theta_2$ | $\phi_M$ | $L_{2,M}$ | $(X_{2,M}, Y_{2,M}, Z_{2,M})$ | 0 |
| ⋮ | ⋮ | ⋮ | ⋮ | ⋮ | ⋮ |
| (N−1)*M+1 | $\Theta_N$ | $\phi_1$ | $L_{N,1}$ | $(X_{N,1}, Y_{N,1}, Z_{N,1})$ | 0 |
| ⋮ | ⋮ | ⋮ | ⋮ | ⋮ | ⋮ |
| NM | $\Theta_N$ | $\phi_M$ | $L_{N,M}$ | $(X_{N,M}, Y_{N,M}, Z_{N,M})$ | 0 |

FIG. 4

| ID:1<br>$(\Theta_1, \phi_1, L_{1,1})$<br>$(X_{1,1}, Y_{1,1}, Z_{1,1})$<br>0 | ID:M+1<br>$(\Theta_2, \phi_1, L_{2,1})$<br>$(X_{2,1}, Y_{2,1}, Z_{2,1})$<br>0 | ... | ID:(N−2)*M+1<br>$(\Theta_{N-1}, \phi_1, L_{N-1,1})$<br>$(X_{N-1,1}, Y_{M-1,1}, Z_{M-1,1})$<br>1 | ID:(N−1)*M+1<br>$(\Theta_N, \phi_1, L_{N,1})$<br>$(X_{N,1}, Y_{N,1}, Z_{N,1})$<br>0 |
|---|---|---|---|---|
| ID:2<br>$(\Theta_1, \phi_2, L_{1,2})$<br>$(X_{1,2}, Y_{1,2}, Z_{1,2})$<br>1 | ID:M+2<br>$(\Theta_2, \phi_2, L_{2,2})$<br>$(X_{2,2}, Y_{2,2}, Z_{2,2})$<br>0 | ... | ID:(N−2)*M+2<br>$(\Theta_{N-1}, \phi_2, L_{N-1,2})$<br>$(X_{N-1,2}, Y_{N-1,2}, Z_{N-1,2})$<br>0 | ID:(N−1)*M+2<br>$(\Theta_N, \phi_2, L_{N,2})$<br>$(X_{N,2}, Y_{N,2}, Z_{N,2})$<br>0 |
| ... | ... | ... | ... | ... |
| ID:M−1<br>$(\Theta_1, \phi_{M-1}, L_{1,M-1})$<br>$(X_{1,M-1}, Y_{1,M-1}, Z_{1,M-1})$<br>0 | ID:2M−1<br>$(\Theta_2, \phi_{M-1}, L_{2,M-1})$<br>$(X_{2,M-1}, Y_{2,M-1}, Z_{2,M-1})$<br>1 | ... | ID:(N−1)*M−1<br>$(\Theta_{N-1}, \phi_{M-1}, L_{N-1,M-1})$<br>$(X_{N-1,M-1}, Y_{N-1,M-1}, Z_{N-1,M-1})$<br>0 | ID:N*M−1<br>$(\Theta_N, \phi_{M-1}, L_{N,M-1})$<br>$(X_{N,M-1}, Y_{N,M-1}, Z_{N,M-1})$<br>0 |
| ID:M<br>$(\Theta_1, \phi_M, L_{1,M})$<br>$(X_{1,M}, Y_{1,M}, Z_{1,M})$<br>0 | ID:2M<br>$(\Theta_1, \phi_M, L_{1,M})$<br>$(X_{1,M}, Y_{1,M}, Z_{1,M})$<br>0 | ... | ID:(N−1)*M<br>$(\Theta_{N-1}, \phi_M, L_{N-1,M})$<br>$(X_{N-1,M}, Y_{N-1,M}, Z_{N-1,M})$<br>0 | ID:N*M<br>$(\Theta_N, \phi_M, L_{N,M})$<br>$(X_{N,M}, Y_{N,M}, Z_{N,M})$<br>0 |

FIG. 5

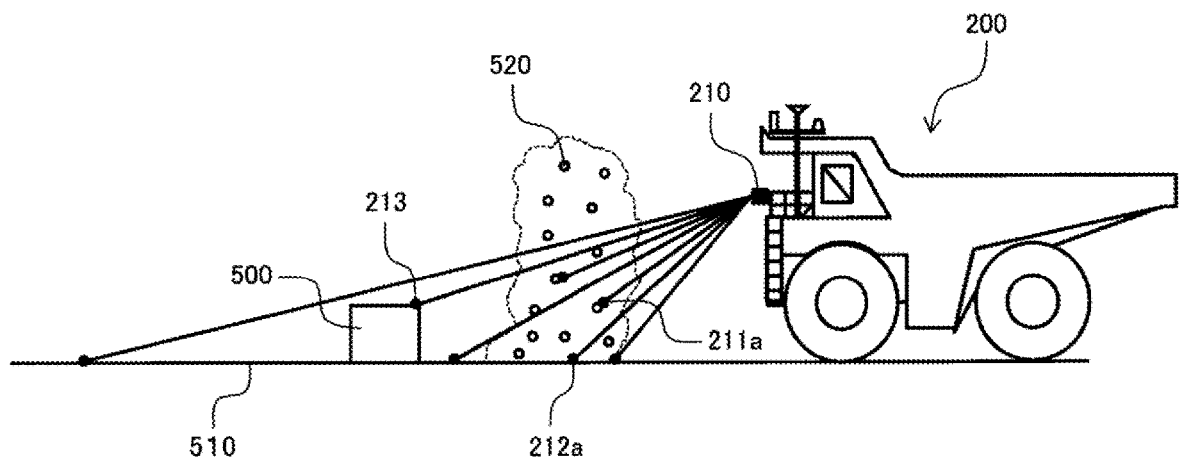

WORK MACHINES

TECHNICAL FIELD

The present invention relates to work machines.

BACKGROUND ART

Work machines such as autonomously travelling dump trucks are used at mining sites for the purpose of enhancing productivity. In addition to operation management performed by using control information, control of autonomous travelling of autonomously travelling dump trucks is performed by grasping the situation around each autonomously travelling dump truck at any time during travelling, and sensing the presence/absence of obstacles, other vehicles, and the like, in order to ensure the safety of the travelling. On the other hand, in off-road environments such as mining sites, since states where microparticles such as dust are floating occur frequently, it is necessary to inhibit errors of sensing the microparticles as objects.

As a technology related to such obstacle sensing, for example, Patent Document 1 discloses a construction vehicle obstacle sensor to be mounted on a construction vehicle that includes a TOF distance image sensor that measures a distance on the basis of a temporal difference between emitted light and reflected light, and a controller that decides the presence/absence of an obstacle on the basis of measurement data of the distance image sensor. If a vehicle advancing direction component from an end of the vehicle, a vehicle width direction component, and a height direction component from the ground of the measurement data are defined as x data, y data, and z data, respectively, the controller performs a height selection step of selecting only measurement data having z data which is greater than a threshold T1, and deciding the presence/absence of an obstacle.

PRIOR ART DOCUMENT

Patent Document

Patent Document 1: JP-2019-12063-A

SUMMARY OF THE INVENTION

Problem to be Solved by the Invention

In the conventional technology described above, by setting a threshold on the basis of reflection intensities that are obtained by measurement of the ground, measurement data about a road surface, and measurement data about microparticles such as dust and water vapors are removed to attempt to enhance the obstacle sensing precision. However, in a case where the sensing subject is a substance like rocks having fallen on a road surface that is similar to the road surface, the reflection intensities of measurement data of the sensing subject and the removal subject have similar values undesirably; as a result, the measurement data of the sensing subject is removed together with measurement data of the road surface or dust undesirably, and there has been a fear that the sensing subject that should be sensed as an obstacle cannot be sensed.

The present invention has been made in view of the problem described above, and an object thereof is to provide work machines that can sense sensing-subject objects more precisely.

Means for Solving the Problem

The present application includes a plurality of means for solving the problem, and an example thereof is a work vehicle that operates at a site, the work vehicle including: a measurement sensor that measures, as three-dimensional point cloud information having a plurality of vertically-adjacent layers, a surface position of an object around the work vehicle; and an object sensor that senses an object as a sensing subject around the work vehicle on a basis of information from the measurement sensor, in which the object sensor acquires three-dimensional point cloud information obtained as a result of measurement by the measurement sensor; senses, as point data, a point where microparticles are measured, on a basis of a relation between distances, from the measurement sensor, of point data of vertically-adjacent layers and variations of distance differences, regarding a plurality of pieces of point data included in the three-dimensional point cloud information; deletes the point data of the sensed microparticles from the three-dimensional point cloud information; and senses an object around the work machine on a basis of the three-dimensional point cloud information from which microparticle point data has been deleted.

Advantages of the Invention

According to the present invention, it is possible to more precisely sense an object as a sensing-subject.

BRIEF DESCRIPTION OF THE DRAWINGS

FIG. 3 is a figure depicting an example of three-dimensional point cloud data treated by the object sensor, and is a figure depicting an overview of each piece of point data included in the three-dimensional point cloud data.

FIG. 4 is a figure depicting an example of the three-dimensional point cloud data treated by the object sensor, and is a figure depicting the data structure of the three-dimensional point cloud data.

FIG. 5 is a figure depicting how it appears when a measurement is performed by an environment recognition sensor mounted on a dump truck, and is a figure depicting a case where there is a microparticle scattering area.

MODES FOR CARRYING OUT THE INVENTION

Embodiments of the present invention are explained below with reference to the figures. Note that whereas a dump truck (autonomously travelling dump truck) which is an autonomously travelling vehicle is depicted as an example of work machines explained in the present embodiments, the present invention can be applied also to other work machines such as hydraulic excavators.

First Embodiment

A first embodiment of the present invention is explained with reference to FIG. 1 to FIG. 14.

Figure 1:
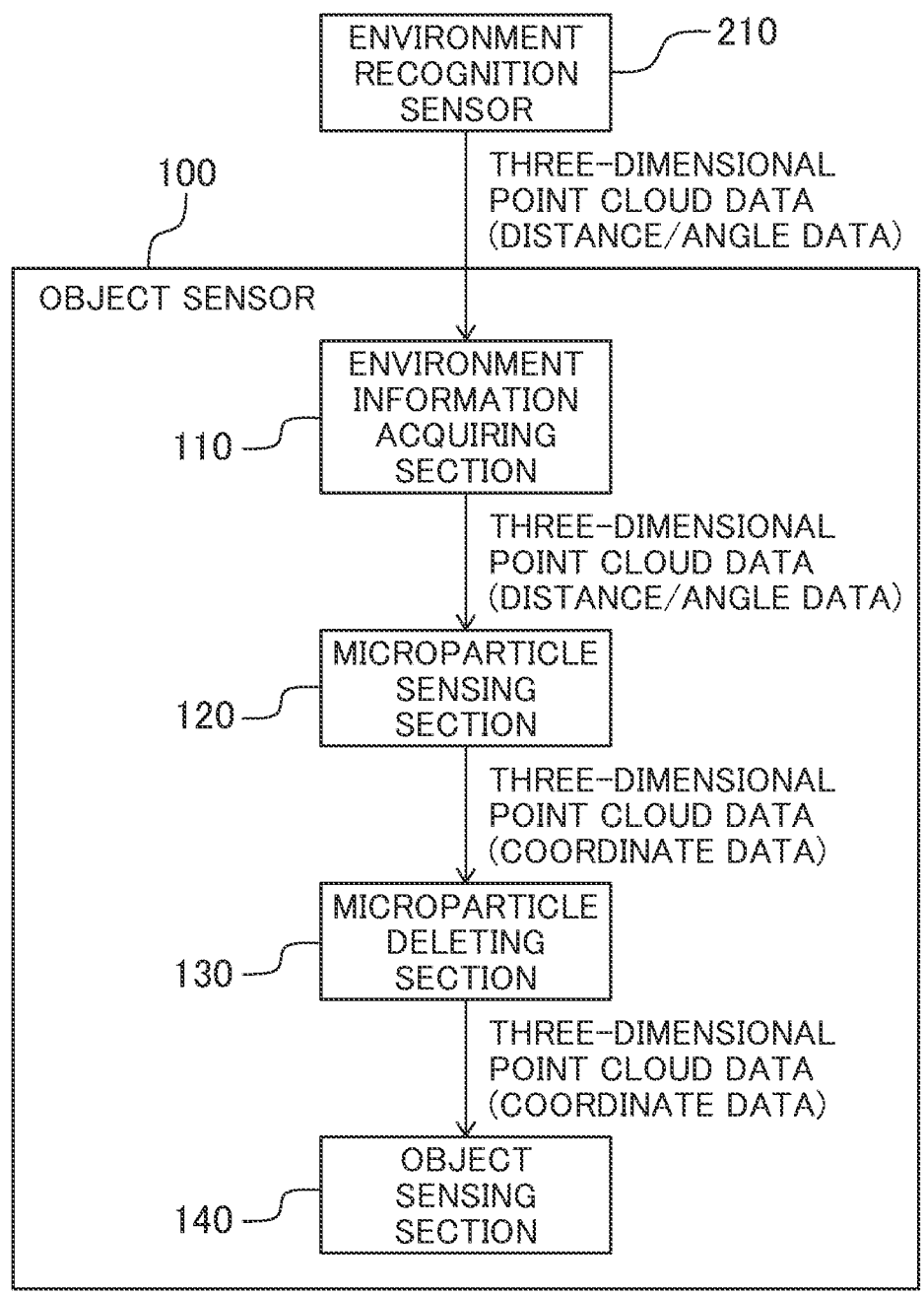
FIG. 1 is a functional block diagram schematically depicting extracted portions of an object sensor according to a first embodiment.

FIG. 1 is a functional block diagram schematically depicting extracted portions of an object sensor according to the present embodiment. In addition, FIG. 2 is a functional block diagram depicting the content of processing by the object sensor.

In FIG. 1, an object sensor 100 can be mounted on an autonomously travelling dump truck (hereinafter, simply referred to as a dump truck) depicted as an example of work machines according to the present embodiment, and includes an environment information acquiring section 110, a microparticle sensing section 120, a microparticle deleting section 130, and an object sensing section 140.

Figure 2:
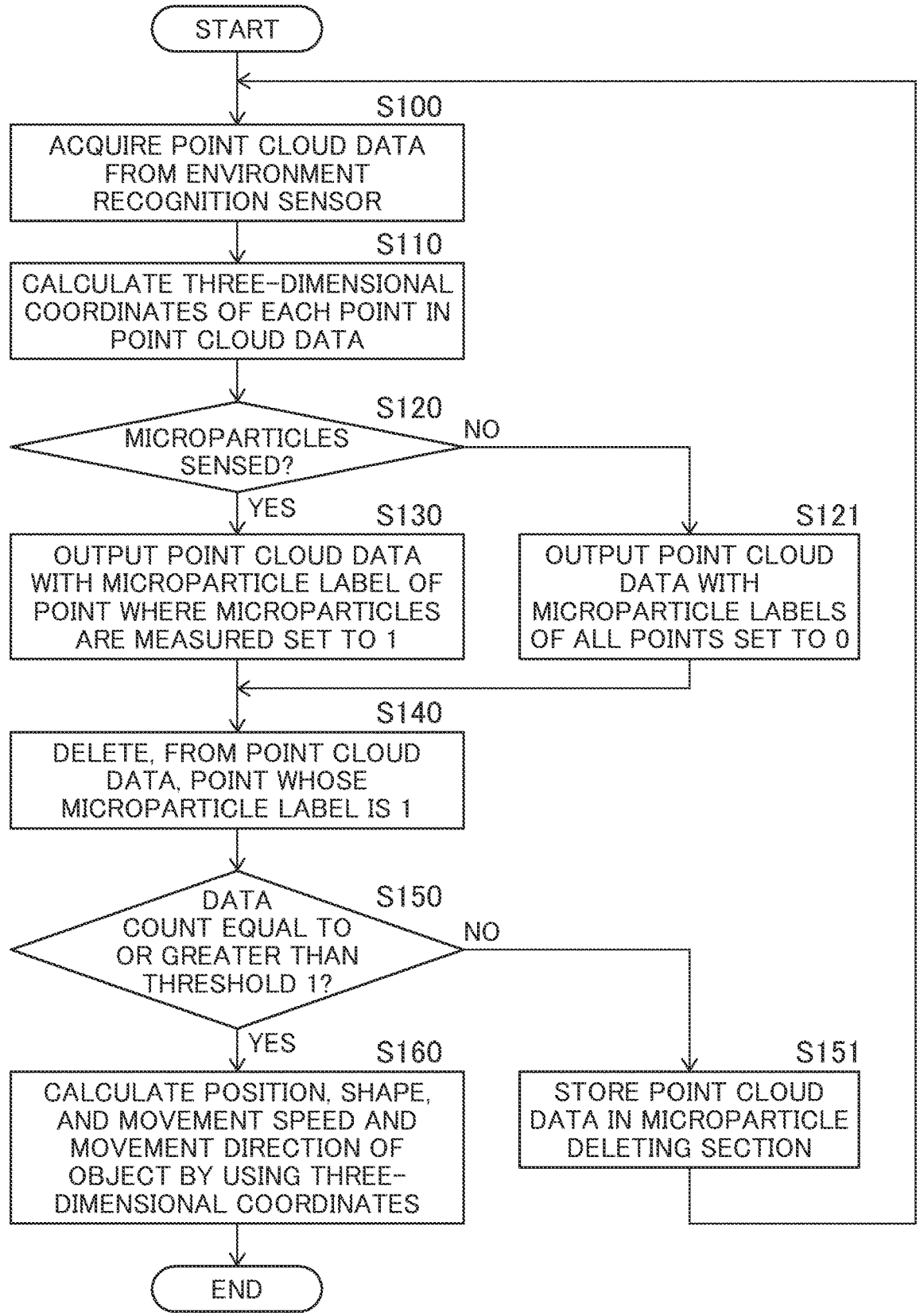
FIG. 2 is a functional block diagram depicting the content of processing by the object sensor.

In FIG. 2, first, the environment information acquiring section 110 of the object sensor 100 acquires three-dimensional point cloud data (three-dimensional point cloud information) from an environment recognition sensor 210 (measurement sensor) provided to the dump truck (Step S100).

The environment recognition sensor 210 is a measurement sensor that is mounted on a dump truck 200 (see FIG. 5 and the like mentioned later), and measures the surface position of an object around the dump truck 200 as three-dimensional point cloud data having a plurality of vertically-adjacent layers. In a case illustrated as an example explained in the present embodiment, a LiDAR (Light Detection And Ranging) is used as the environment recognition sensor 210. Note that the environment recognition sensor 210 may be anything as long as it can measure the three-dimensional position of an object surface positioned around the dump truck 200, which is a work machine. For example, a distance image sensor may be used, or known triangulation may be used with a stereo camera. In addition, a plurality of sensors such as stereo cameras or LiDARs may be used in combination.

FIG. 3 and FIG. 4 are figures depicting examples of the three-dimensional point cloud data treated by the object sensor. FIG. 3 is a figure depicting an overview of each piece of point data included in the three-dimensional point cloud data, and FIG. 4 is a figure depicting the data structure of the three-dimensional point cloud data.

As depicted in FIG. 3, the three-dimensional point cloud data acquired by the environment recognition sensor 210 includes: an ID of each piece of point data acquired by the environment recognition sensor 210; the distance from the environment recognition sensor 210 to each measurement point; and the horizontal angle and vertical angle from a reference direction. That is, the three-dimensional point cloud data acquired by the environment recognition sensor 210 is distance/angle data, and data IDs, horizontal measurement angles, vertical measurement angles, and measurement distances on the left in FIG. 3 correspond to the distance/angle data.

Next, the environment information acquiring section 110 receives the three-dimensional point cloud data including the distance/measurement-angle information from the environment recognition sensor 210, converts each piece of point data into three-dimensional coordinates in a rectangular coordinate system (vehicle coordinate system) centered on the own vehicle, and appends the three-dimensional coordinates to the three-dimensional point cloud data (Step S110).

As depicted in FIG. 3, the environment information acquiring section 110 converts the three-dimensional point cloud data into data including data IDs, horizontal measurement angles, vertical measurement angles, measurement distances, three-dimensional coordinates, and microparticle labels.

Specifically, the environment information acquiring section 110, on the basis of the point cloud data including information about distances and measurement angles output from the environment recognition sensor 210, and the installation position of the environment recognition sensor 210 as seen from the center of the own vehicle, calculates the three-dimensional coordinates of each measurement point in the rectangular coordinate system (vehicle coordinate system) having its origin at the center of the own vehicle, appends the calculated information to the original three-dimensional point cloud data, and outputs the three-dimensional point cloud data to the microparticle sensing section 120.

Note that when a stereo camera is used as the environment recognition sensor 210, three-dimensional rectangular coordinates are acquired by triangulation. Then, by calculating a three-dimensional polar coordinate system of each point having its origin at the center of measurement of the sensor on the basis of the installation position of the sensor and the acquired rectangular coordinates, information about the distance to the object and a measurement distance can be acquired.

Here, each microparticle label is a label representing whether or not a piece of point data is data of a point where microparticles are measured. A microparticle label which is "1" means that the data is about a point where microparticles are measured, and a microparticle label which is "0" (zero) means that the data is about a point where an object other than microparticles is measured. Note that the initial value of microparticle label of the three-dimensional point cloud data output from the environment information acquiring section 110 is set to "0" (zero). As depicted in FIG. 4, the environment information acquiring section 110 outputs, as the three-dimensional point cloud data, two-dimensional array data including pieces of data that are arrayed in the row direction according to horizontal measurement angles, and arrayed in the column direction according to vertical measurement angles.

Next, the microparticle sensing section 120, on the basis of the three-dimensional point cloud data acquired from the environment information acquiring section 110, uses distance information about each piece of point data to decide whether or not the piece of point data is data obtained by measuring microparticles (Step S120). When the result of the decision is YES, the microparticle label of the relevant point data is set to "1" (Step S130), and when the result of the decision is NO, the microparticle label of the relevant point data is set to "0" (zero) (Step S121).

Here, the basic principle of the microparticle sensing process by the microparticle sensing section 120, that is, details of the processes at Steps S120, S121, and S130 in FIG. 2, is explained.

Figure 6:
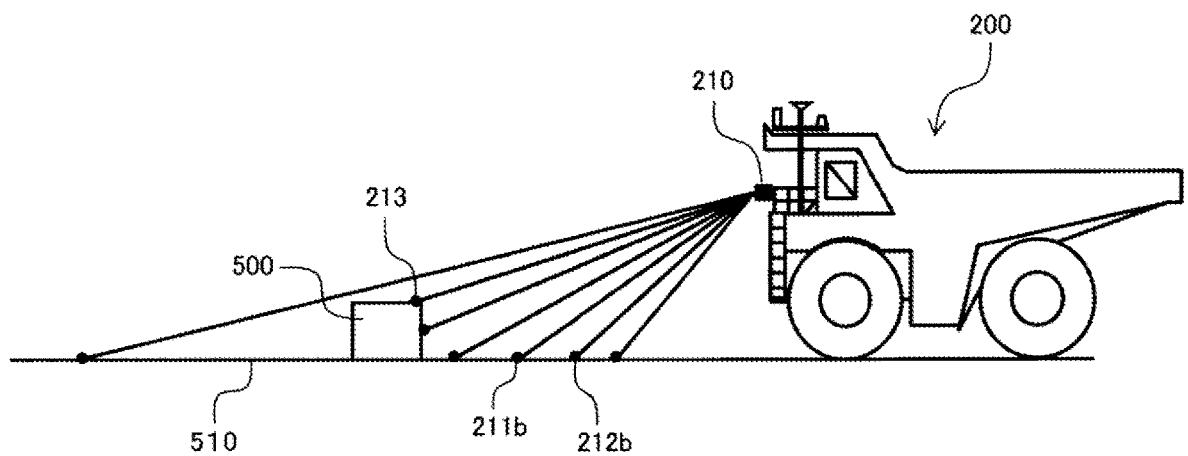
FIG. 6 is a figure depicting how it appears when a measurement is performed by the environment recognition sensor mounted on the dump truck, and is a figure depicting a case where there is not a microparticle scattering area.

FIG. 5 and FIG. 6 are figures depicting how it appears when measurements are performed by the environment recognition sensor mounted on the dump truck. FIG. 5 is a figure depicting a case where there is a microparticle scattering area. FIG. 6 is a figure depicting a case where there is not a microparticle scattering area.

As depicted in FIG. 5, at a mining site or the like, due to an effect of wind, travel actions of the dump truck 200, and the like, a plurality of grains of sand which are one type of microparticle float in some cases (so-called dust occurs in some cases). Typically, when microparticles like dust are floating in the air, as depicted in FIG. 5, a point 211a where microparticles are measured, a point 212a where a ground 510 is measured through between the particles, and a point 213 where an object 500 in an area behind the dust is measured are mixedly present. At this time, regarding points where the ground is measured when an object is not present, as in FIG. 6, a lower point 212b gives a shorter measurement distance than a point 212a measured with an upper scanning line. However, when microparticles are measured, as depicted in FIG. 5, there can be data like the point 211a and the point 212a that presents a reversed distance relation. That is, in a case where it is considered that the ground 510 is measured, a reversal of the relation occurs in which the measurement distance of the point 211a whose angle of depression as measured relative to the horizontal direction from the environment recognition sensor 210 is larger becomes shorter than the measurement distance of the point 211b whose angle of depression is smaller. Accordingly, the point 211a having this reversed distance relation is decided as a point where microparticles are measured.

Note that whereas dust (grains of sand) is depicted as an example of microparticles floating in the air explained in the present embodiment, other microparticles that are present in the air like raindrops (raindrops), fog, smoke, water vapors, and the like can also be sensed similarly.

It should be noted that depending on the shape of an object that is present at a mining site, the distance relation is reversed in some cases despite the fact that it is not a microparticle scattering area. In view of this, by setting a predetermined threshold (threshold 2), and comparing a distance difference between vertically-adjacent pieces of point data with the threshold, it is decided whether a reversal of a distance relation is caused by microparticles or by the shape of an object. This threshold 2 is decided as the larger one of the values of the width and depth of the largest object in objects having shapes that cause a reversal of a distance relation, in sensing subjects that are expected to be present in the travel environment of the vehicle. For example, such an object is a spherical rock or the like if the travel environment is a mining site. Furthermore, since distance differences between distance measurement points of an object are equal to or smaller than the size of the object, the variance of the distance differences tends to be small. On the other hand, when microparticles are measured, points where near grounds are measured have small distance differences, but data of measurements of far grounds have large distance differences. That is, as compared with a case where an object is measured, the variance of distance differences increases. In view of this, the variance of distance differences in a case where the largest object in objects having shapes that cause a reversal of a distance relation is measured is set as a threshold 3. The variance of vertical distance differences between pieces of point data is compared with the threshold 3, thereby it is decided whether a reversal of a distance relation is caused by microparticles or by the shape of an object, and a sensing error of microparticle is prevented more surely.

Figure 7:
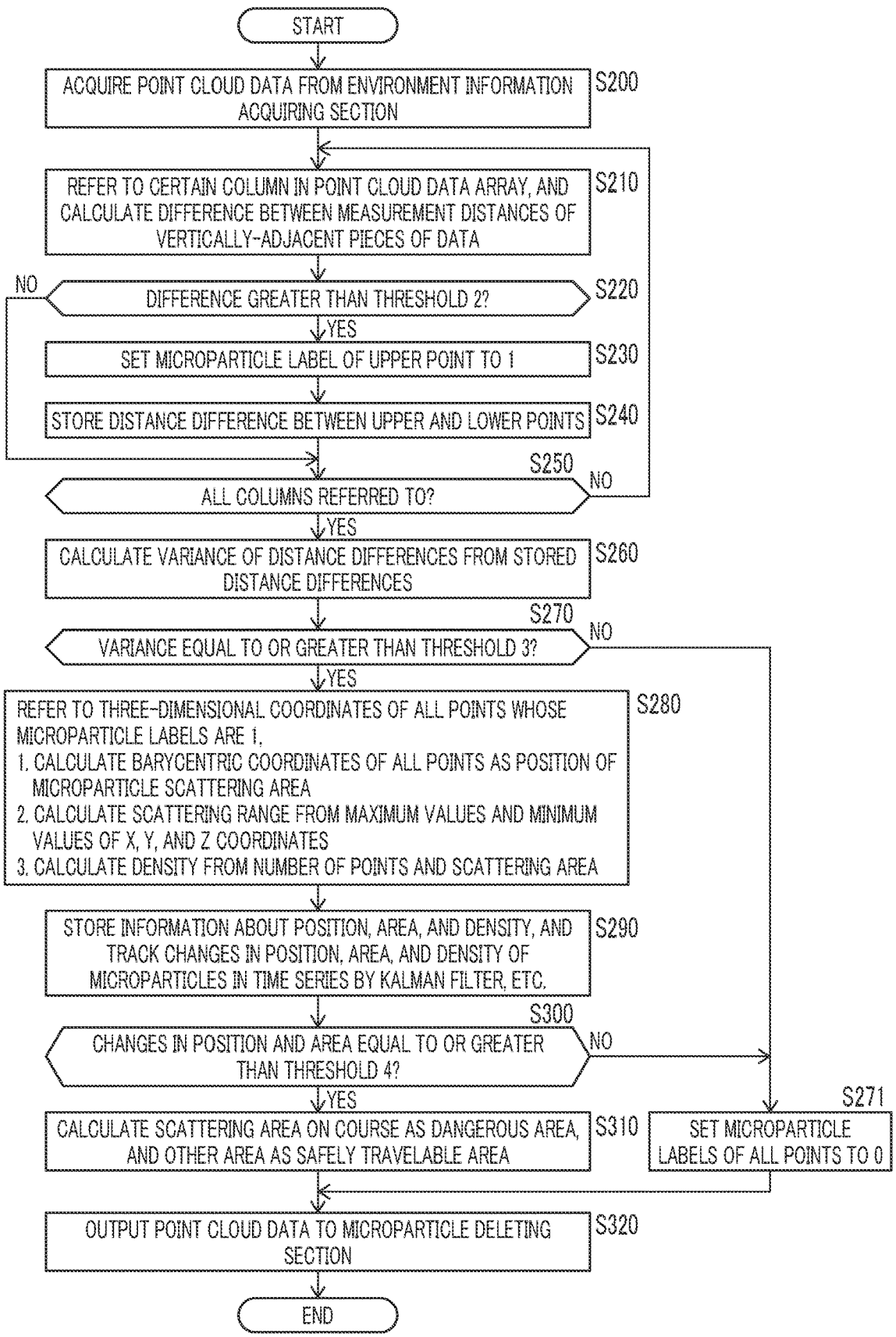
FIG. 7 is a flowchart depicting the processing content of a microparticle sensing process by a microparticle sensing section.

FIG. 7 is a flowchart depicting the processing content of the microparticle sensing process by the microparticle sensing section.

In FIG. 7, first, the microparticle sensing section 120 acquires the three-dimensional point cloud data from the environment information acquiring section 110 (Step S200), refers to data in the same column in the two-dimensional array in the three-dimensional point cloud data (see FIG. 4), and calculates the difference between the measurement distance of a point and the measurement distance of a point on a row adjacently above the point sequentially starting from the point in the bottom row (Step S210). Note that, at Step S210, the difference is calculated by subtracting the measurement distance of point data in the upper row from the measurement distance of point data in the lower row.

Next, it is decided whether or not the distance difference is equal to or greater than the predetermined threshold (threshold 2) (Step S220). When the result of the decision is YES, that is, when the measurement distance of the lower point data is longer than the measurement distance of the upper point data at least by the predetermined distance, the microparticle label of the upper point data is set to "1" (Step S230), and the distance difference calculated at Step S210 is stored (Step S240).

When the result of the decision at Step S220 is NO or when the process at Step S240 is ended, next, it is decided whether or not all columns in the three-dimensional point cloud data have been referred to (Step S250). When the result of the decision is NO, the processes from Steps S210 to S250 are repeated until the result of the decision becomes YES.

In addition, when the result of the decision at Step S250 is YES, the variance of the differences between the measurement distances of the pieces of point data stored at Step S240 is calculated (Step S260), and it is decided whether or not the variance is equal to or greater than the predetermined threshold (threshold 3) (Step S270). Here, the threshold 3 is set to a value between the variance of differences between measurement distances in a case where an object is measured, and the variance of differences between measurement distances in a case where microparticles in a scattering area are measured. The variance of differences between measurement distances is calculated in advance about an object that can be present in an environment where a work machine (e.g. the dump truck 200) on which the object sensor 100 is mounted operates. The sum of this value and a margin is set as the threshold 3, and thereby it is possible to decide whether distances to an object are measured or distances to microparticles are measured.

When the result of the decision at Step S270 is YES, three-dimensional coordinates of all pieces of point data whose microparticle labels are set to "1" are referred to, and the barycentric coordinates of those pieces of point data are calculated as the position of a microparticle scattering area (Step S280). In addition, a rectangular parallelepiped area whose depth, width, and height are the distances from the maximum values to the minimum values of the x, y, and z coordinates, respectively, is defined, and this area is calculated as the microparticle scattering area (Step S280). Furthermore, the density of microparticles in the scattering area is calculated from the volume of the rectangular parallelepiped calculated as the microparticle scattering area, and the data count of point data whose microparticle labels are "1" (Step S280).

Next, information about the position, range, and density of the microparticle scattering area calculated at Step S280 is accumulated in time series, and temporal changes in the position, range, and density are calculated and tracked by using a tracking technique such as the known Kalman filter (Step S290).

Next, it is decided whether or not the temporal changes in the position and range of the scattering area calculated at Step S290 are equal to or greater than a predetermined threshold (threshold 4) (Step S300). When the result of the decision is YES, an area that is on the movement route of the own vehicle and has the microparticle scattering area is set as a dangerous area, an area that is on the movement route and does not have the microparticle scattering area is set as a safely travelable area (Step S310), the three-dimensional point cloud data is output to the microparticle deleting section 130 (Step S320), and the process is ended. Here, the threshold 4 is a certain value greater than the value of distance precision of object sensing by the object sensing section 140.

In addition, when the result of the decision at Step S270 is NO or when the result of the decision at Step S300 is NO, the microparticle labels of all pieces of point data are set to "0" (zero) (Step S271), the three-dimensional point cloud data is output to the microparticle deleting section 130 (Step S320), and the process is ended.

FIG. 2 is referred to again.

When the process at Step S130 or S121 ends, next, the microparticle deleting section 130 deletes, from the three-dimensional point cloud data, point data of a point decided as a point where microparticles are measured (i.e. point data whose microparticle label is set to "1") (Step S140).

Next, it is decided whether or not the point data count after the deletion is equal to or greater than a predetermined threshold (threshold 1) (Step S150). When the result of the decision is NO, the three-dimensional point cloud data is stored on the microparticle deleting section 130 (Step S151), and the process returns to Step S100. Here, the basic principle of the microparticle deletion process by the microparticle deleting section 130, that is, details of the processes at Steps S140, S150, and S151 in FIG. 2, is explained.

Figure 8:
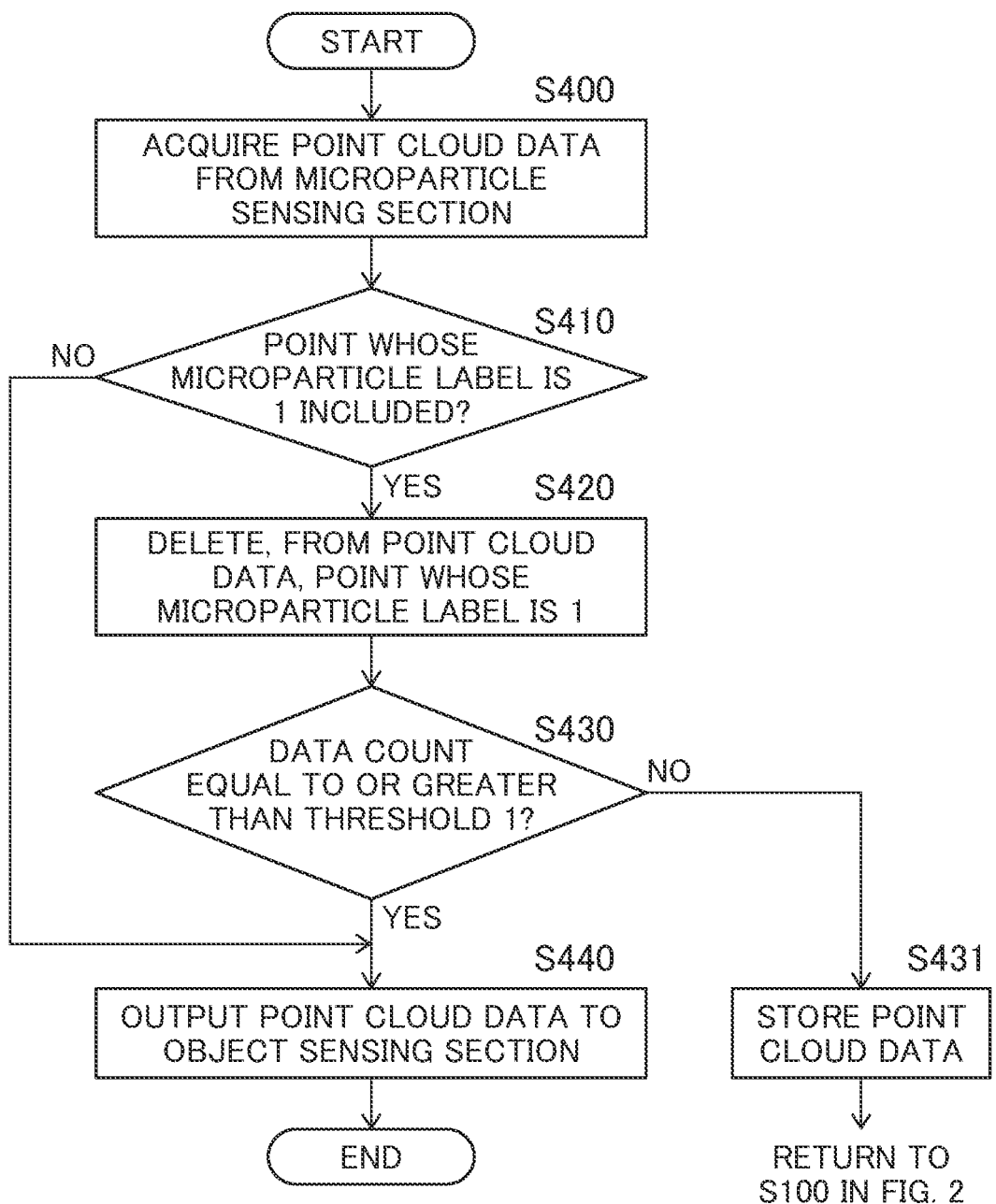
FIG. 8 is a flowchart depicting the processing content of a microparticle deletion process by a microparticle deleting section.

FIG. 8 is a flowchart depicting the processing content of the microparticle deletion process by the microparticle deleting section.

As depicted in FIG. 8, first, the microparticle deleting section 130 acquires the three-dimensional point cloud data from the microparticle sensing section 120 (Step S400), and decides whether or not there is point data whose microparticle label is "1" (Step S410).

When the result of the decision at Step S410 is NO, this means that microparticles are not measured, the three-dimensional data is output to the object sensing section 140 (Step S440), and the process is ended.

In addition, when the result of the decision at Step S410 is YES, point data whose microparticle label is "1" is deleted from the three-dimensional point cloud data (Step S420), and it is decided whether or not the total of the point data count of the three-dimensional point cloud data after the deletion and the point data count of stored point data (see Step S431 mentioned later) is equal to or greater than the predetermined threshold (threshold 1) (Step S430).

When the result of the decision at Step S430 is YES, that is, when the point data count is sufficient for enabling object sensing, the three-dimensional data is output to the object sensing section 140 (Step S440), and the process is ended.

In addition, when the result of the decision at Step S430 is NO, that is, when it is decided that the point data count is not sufficient for enabling object sensing, the three-dimensional point cloud data totaled at Step S430 is stored (Step S431), and the procedure returns to the first process of the object sensor 100 (Step S100 in FIG. 2).

Here, the threshold 1 is a fixed value that is determined in accordance with the following (Formula 1) and (Formula 2) by using spatial resolution dh of the environment recognition sensor 210, a point data count n0 of the original three-dimensional point cloud data, a size Smin of the smallest sensing subject that is expected to be required to be sensed (desired to be sensed), and a longest sensing distance rt.

[Equation 1]

$$n_t = s_{min} \div 2 \cdot r_t^2 - 2 \cdot r_t^2 \cdot \cos d_h \quad \text{(Formula 1)}$$

[Equation 2]

$$d_p = n_o \cdot \frac{1}{n_t} \quad \text{(Formula 2)}$$

In accordance with (Formula 1) and (Formula 2) described above, the distance between adjacent measurement points at the longest distance is determined from the spatial resolution of the sensor. On the basis of this distance, and the size of the smallest sensing subject, the number nt of points where the sensing subject is measured can be calculated. If the number nt of the points is not equal to or greater than one, a measurement cannot be performed first of all, therefore the value obtained by dividing 1 by the number nt of the points described above is the ratio of data that can be deleted. The value obtained by multiplying the ratio by the data count no of the original point cloud data is the threshold 1.

FIG. 2 is referred to again.

When the result of the decision at Step S150 is YES, the object sensing section 140 acquires the three-dimensional point cloud data from the microparticle deleting section 130, and information about the position/shape/movement-speed/movement-direction of an object positioned around the vehicle is sensed in time series (Step S160).

Here, the processing content of the object sensing process by the object sensing section 140 is explained.

The object sensing section 140 acquires the point cloud data from the microparticle deleting section 130, and acquires the information about the position/shape/movement-speed/movement-direction of the object around the own vehicle by using three-dimensional coordinate information about point clouds. Here, the position of the object is barycentric coordinates calculated by using the three-dimensional coordinates of each point where the sensed object is measured. In addition, the shape is a rectangular parallelepiped whose depth, width, and height are calculated as the distances from the maximum values to the minimum values of the x, y, and z coordinates, respectively, from the three-dimensional coordinates of each point.

For example, as a technique of sensing the position/shape of an object, any technique such as the known OGM (Occupancy Grid Map) or VoxelNet using machine learning by which the object information described above can be acquired from three-dimensional point clouds may be used. In addition, as a technique of sensing the movement speed/direction of an object, any technique such as a technique using the known Kalman filter or particle filter by which the movement speed/direction of the object can be estimated in time series may be used.

Effects and advantages of the thus-configured object sensor are explained.

The object sensor 100 includes the environment recognition sensor 210, the environment information acquiring section 110, the microparticle sensing section 120, the microparticle deleting section 130, and the object sensing section 140. The environment information acquiring section 110 receives the three-dimensional point cloud data including the distance/measurement-angle information from the environment recognition sensor 210, calculates the three-dimensional coordinates of each point in the rectangular coordinate system centered on the own vehicle, appends the three-dimensional coordinates to the three-dimensional point cloud data, and outputs the three-dimensional point cloud data to the microparticle sensing section 120. The microparticle sensing section 120 acquires the three-dimensional point cloud data from the environment information acquiring section 110, and decides whether microparticles are measured at each point by using distance information about the point. The microparticle label of a point decided as a point where microparticles are measured is set to "1." The microparticle deleting section 130 receives the three-dimensional point cloud data from the microparticle sensing section 120, and deletes, from the three-dimensional point cloud data, a point decided as a point where microparticles are measured. It is decided whether the data count after the deletion is equal to or greater than the threshold 1. When the data count is equal to or greater than the threshold 1, the three-dimensional point cloud data is output to the object sensing section 140. When the data count is equal to or smaller than the threshold 1, the three-dimensional point cloud data is stored on the microparticle deleting section 130. The object sensing section 140 acquires the three-dimensional point cloud data from the microparticle deleting section 130, and information about the position/shape/movement-speed/movement-direction of an object positioned around the vehicle is sensed in time series. Accordingly, the object sensing section 140 can avoid sensing failures and sensing errors due to the influence of microparticles.

In addition, the microparticle sensing section 120 refers to the column direction of the array in the three-dimensional point cloud data, and can perform sensing by deciding, as a point where microparticles are measured, the upper point in vertically-adjacent points when the measurement distance of the lower point is greater than the distance threshold 2, and also the value of the variance of distance differences is greater than the threshold 3. Accordingly, a point where microparticles are measured can be sensed without sensing errors.

In addition, the microparticle sensing section 120 senses a point where microparticles are measured, and can acquire information about the position, range, and density of a microparticle scattering area by using the three-dimensional coordinates of the point. In addition, since microparticles are floating objects, the position, range, and density of a scattering area change when they are tracked in time series. Accordingly, when a change is smaller than the threshold 4, it is determined that not microparticles, but an object is sensed, and microparticle labels of all points are set to "0." Accordingly, a point where microparticles are measured can be sensed without sensing errors.

In addition, the microparticle sensing section 120 senses a point where microparticles are measured, and can acquire information about the position, range, and density of a microparticle scattering area by using the three-dimensional coordinates of the point. In addition, by using those pieces of information, it is possible to calculate, as a dangerous area, an area that is on the course of the own vehicle, and has microparticles, and calculate, as a safely travelable area, an area that is on the course, and does not have microparticles. Accordingly, even if microparticles are generated, it is possible to cause the own vehicle to travel safely.

In addition, the microparticle deleting section 130 compares the threshold 1 and the data count of the three-dimensional point cloud data after the deletion with each other, and, when the data count is smaller than the threshold 1, accumulates point clouds until the data count becomes equal to or greater than the threshold 1. Accordingly, sensing failures of objects can be avoided.

A case where the thus-configured object sensor 100 is mounted on the dump truck 200 is explained in more detail.

Although not depicted in the figures, the dump truck 200 on which the object sensor 100 according to the present embodiment is mounted generally includes: a vehicle body frame that forms a support structure extending in the front-back direction; a cargo bed (vessel) that is arranged so as to extend in the front-back direction at an upper section of the vehicle body frame, and is provided to be tiltable relative to the vehicle body frame via a pin-joining portion at its lower rear end portion; a pair of follower wheels (front wheels) that are provided on the left and right at the lower front portion of the vehicle body frame; a pair of driving wheels (rear wheels) that are provided on the left and right at the lower rear portion of the vehicle body; an operation room (cab) provided at the upper front portion of the vehicle body frame; a fuel tank provided below the vehicle body frame; an engine that is arranged on the vehicle body frame, and is driven by a fuel supplied from the fuel tank; and a vehicle controller 300 that controls autonomous travelling of the dump truck 200.

Figure 9:
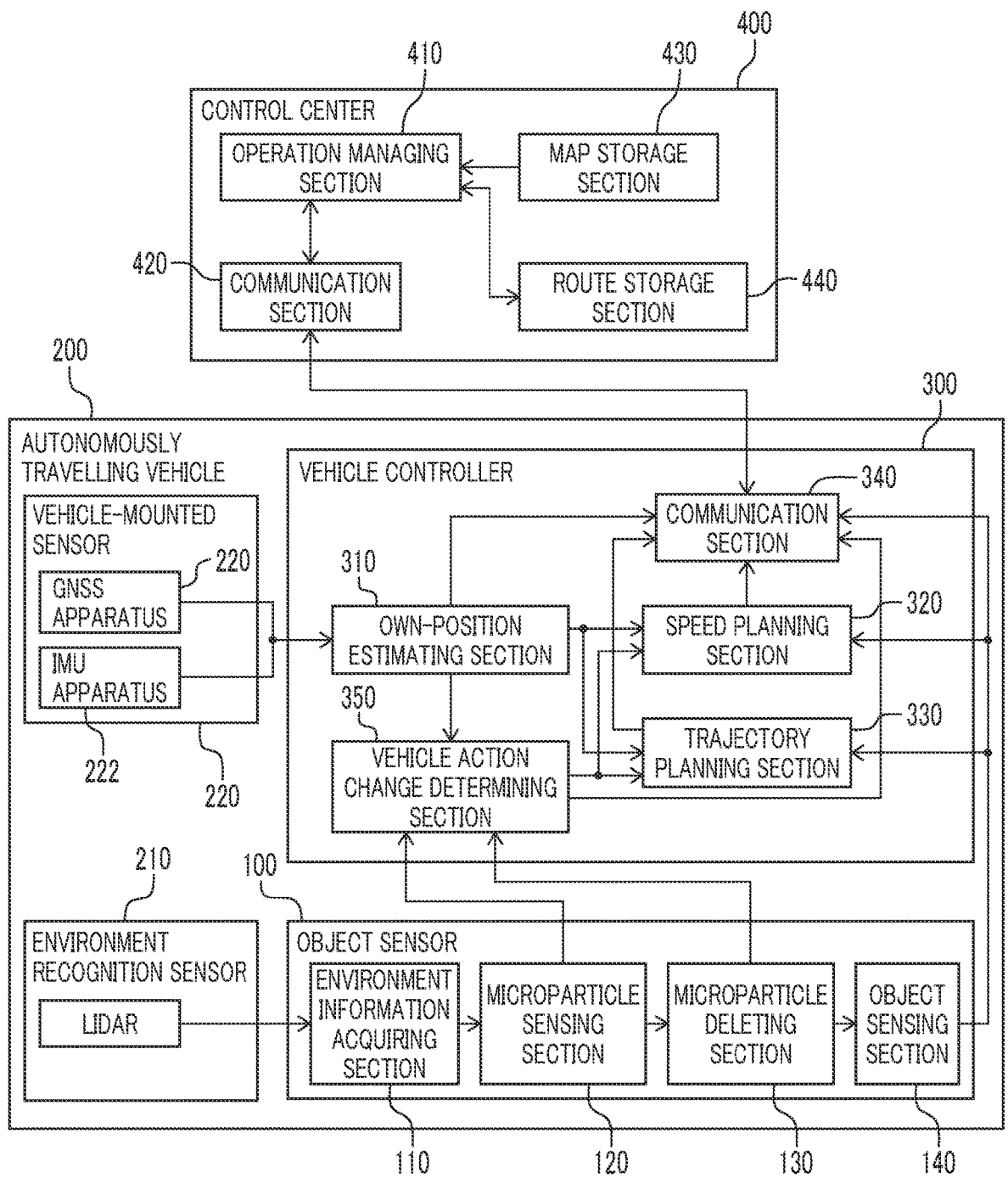
FIG. 9 is a functional block diagram schematically depicting processing functionalities of the dump truck on which the object sensor is mounted.

FIG. 9 is a functional block diagram schematically depicting processing functionalities of the dump truck on which the object sensor is mounted.

In FIG. 9, the dump truck 200 includes the object sensor 100, the environment recognition sensor 210, a vehicle-mounted sensor 220, the vehicle controller 300, and a control center 400 that manages operation of the dump truck 200.

The environment recognition sensor 210 performs measurements of the environment around the own vehicle, and outputs point cloud data 215 to the object sensor 100.

The object sensor 100 calculates information about the position, shape, movement speed, and movement direction of an object positioned around the own vehicle, and outputs the information to the vehicle controller 300. In addition, the object sensor 100 outputs, to the vehicle controller 300, a microparticle scattering situation calculated by the microparticle sensing section 120, and point cloud deficiency information calculated by the microparticle deleting section 130. The vehicle-mounted sensor 220 measures the position and posture of the own vehicle, and transmits the position and posture to the vehicle controller 300.

The control center 400 acquires positional information about each vehicle, and outputs operation management information to the vehicle controller 300.

The vehicle controller 300 decides the speed and steering angle of the vehicle such that object sensing can be implemented surely, on the basis of the operation management information received from the control center 400, information about its own position and vehicle posture acquired from the vehicle-mounted sensor 220, and object information and microparticle information acquired from the object sensor 100, and outputs the speed and steering angle to an actuator.

The environment recognition sensor 210 is mounted on the dump truck 200, and performs measurement of the environment around the vehicle. In the present embodiment, a LiDAR is used as the environment recognition sensor 210.

The vehicle-mounted sensor 220 is mounted on the dump truck 200, and measures positional and postural information about the own vehicle. In the present embodiment, a GNSS (Global Navigation Satellite System) apparatus 221 is used as a sensor to measure positions. In addition, an IMU (Inertial Measurement Unit) apparatus 222 is used as a sensor to measure postures.

The vehicle controller 300 includes an own-position estimating section 310, a speed planning section 320, a trajectory planning section 330, a communication section 340, and a vehicle action change determining section 350, and decides speed or steering angle information for controlling the vehicle.

The control center 400 includes an operation managing section 410, a communication section 420, a map storage section 430, and a route storage section 440, and manages and controls operation of a plurality of dump trucks 200. Details are mentioned later.

Figure 10:
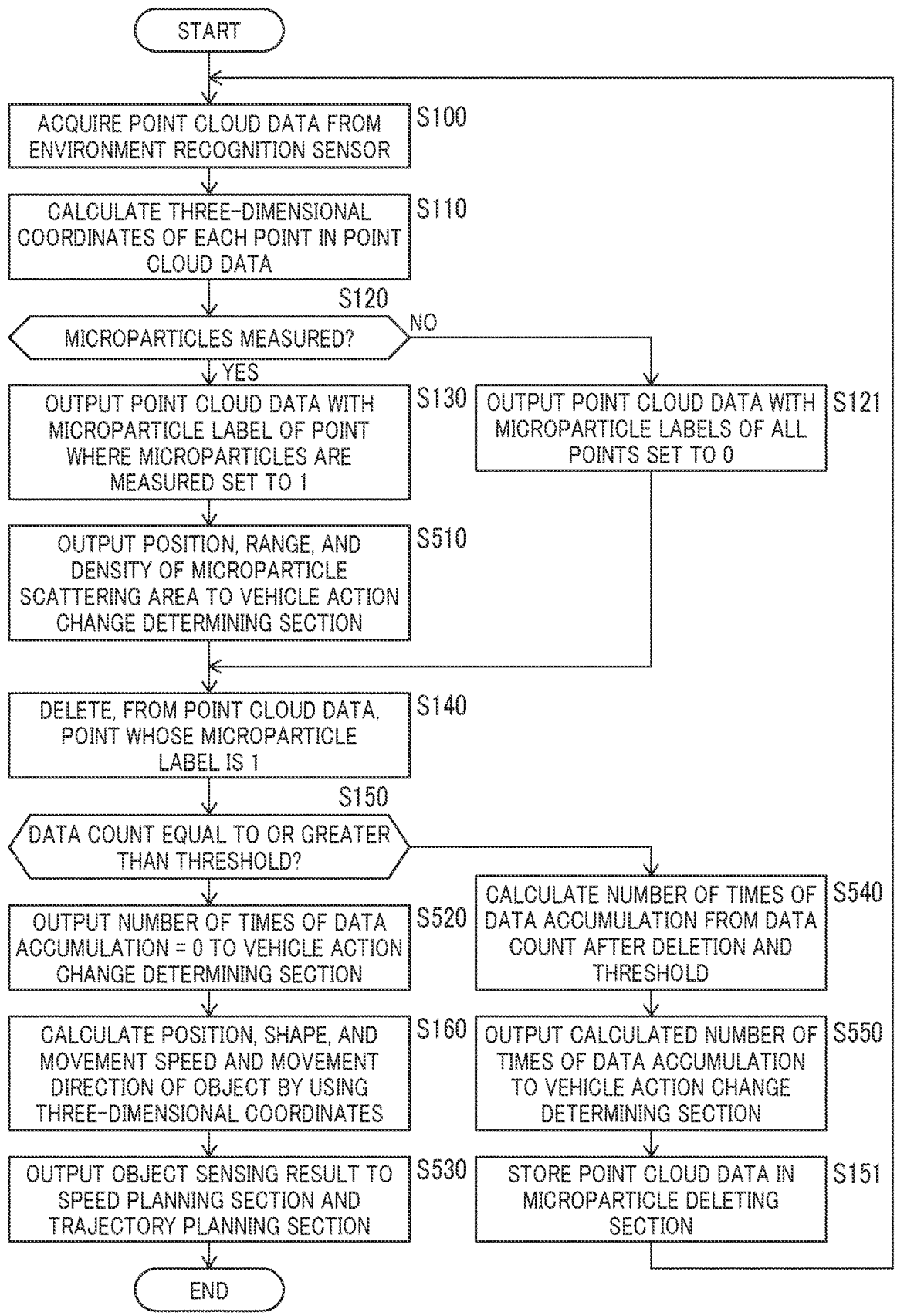
FIG. 10 is a flowchart depicting the content of processing by the object sensor mounted on the dump truck.

FIG. 10 is a flowchart depicting the content of processing by the object sensor mounted on the dump truck. Note that processing content in FIG. 10, which is the same as its counterpart in FIG. 2, is given the same reference character, an explanation thereof is omitted, and only differences are explained.

The time-series information about the position, range, and density of the microparticle scattering area calculated by the microparticle sensing section 120 at Step S130 is output to the vehicle action change determining section 350 of the vehicle controller 300 (Step S510).

In addition, when the result of the decision at Step S150 is YES, "0" (zero) is assigned to the number of times of data accumulation, and the number of times of data accumulation is output to the vehicle action change determining section 350 (Step S520). The object sensing section 140 acquires the three-dimensional point cloud data from the microparticle deleting section 130, senses, in time series, information about the position/shape/movement-speed/movement-direction of an object positioned around the vehicle (Step S160). Object sensing is implemented by the object sensing section 140 by using the three-dimensional point cloud data, and information about the position and shape of a sensed object is output to the speed planning section 320 and the trajectory planning section 330 (Step S530).

In addition, when the result of the decision at Step S150 is NO, the threshold 1 is divided by the data count after the deletion to thereby calculate the number of times of data accumulation (Step S540), and the number of times of accumulation is output to the vehicle action change determining section 350 (Step S550).

Here, the position of the object is barycentric coordinates calculated by using the three-dimensional coordinates of each point where the sensed object is measured. In addition, the shape is a rectangular parallelepiped whose depth, width, and height are calculated as the distances from the maximum values to the minimum values of the x, y, and z coordinates, respectively, from the three-dimensional coordinates of each point.

Next, the content of processing by the control center 400 is explained.

The control center 400 acquires positional information, speed information, and travel trajectory from a plurality of dump trucks 200 at the communication section 420, and outputs them to the operation managing section 410. In addition, the map storage section 430 has stored thereon in advance map information in which roads for autonomously travelling vehicles in a mine are segmented into zones with predetermined sizes, and travel routes and limited speeds in those zones are set. The map storage section 430 outputs the map information to the operation managing section 410. The route storage section 440 has stored thereon the current travel route of each vehicle, and outputs the stored route information about each vehicle to the operation managing section 410. The operation managing section 410 grasps the position of each vehicle on a map by superimposing, on the map, information about the position of each vehicle by using the acquired map information, and positional information about each vehicle. When it is determined, on the basis of the position of each vehicle on the map, and the route information about each vehicle, that travelling on the current route is to be completed, the next travel route on the map as a new travel route, and also a limited speed included in the route as a target speed are output to the dump truck 200 through the communication section 420. In addition, a new travel route of each vehicle is output to the route storage section 440.

Next, the content of processing by the vehicle controller 300 is explained. The communication section 340 receives a target speed and a travel route from the control center 400. The communication section 340 outputs the received target speed to the speed planning section 320, and outputs the received travel route to the trajectory planning section 330. The own-position estimating section 310, by using positional data acquired from the vehicle-mounted sensor 220, and postural data about the vehicle body including accelerations along six axes in the directions of X, y, z, role, pitch, and yaw, estimates the current position and speed of the vehicle, and outputs the current position and speed to the speed planning section 320, the trajectory planning section 330, and the vehicle action change determining section 350. The vehicle action change determining section 350 acquires time-series information about the position, range, and density of a microparticle scattering area from the microparticle sensing section 120, the number of times of data accumulation from the microparticle deleting section 130, and the current position and vehicle speed from the own-position estimating section 310. When the number of times of data accumulation is "0" (zero), the maximum vehicle speed of the dump truck 200 is output to the speed planning section 320. When the number of times of data accumulation is equal to or greater than one, a vehicle speed calculated by a process mentioned later is output to the speed planning section 320. Details of processes by the vehicle action change determining section 350 are mentioned later. The speed planning section 320 compares the target speed acquired from the communication section 340 and the vehicle speed acquired from the vehicle action change determining section 350 with each other, and sets the lower speed as the target speed. The acceleration amount or deceleration amount is calculated from the difference between the current vehicle speed and the target speed, and the operation amount of an actuator is decided. The trajectory planning section 330, on the basis of the travel route, the current position, and the positional and shape information of an object around the vehicle acquired from the object sensor 100, decides such a target trajectory that the vehicle does not collide with the object, and additionally passes through a route with the least deviation from the current travel route, and calculates such a steering angle that the vehicle can travel along the trajectory, on the basis of the difference between the current position and the position of the target trajectory.

Next, the content of processing by the vehicle action change determining section 350 is explained.

Figure 11:
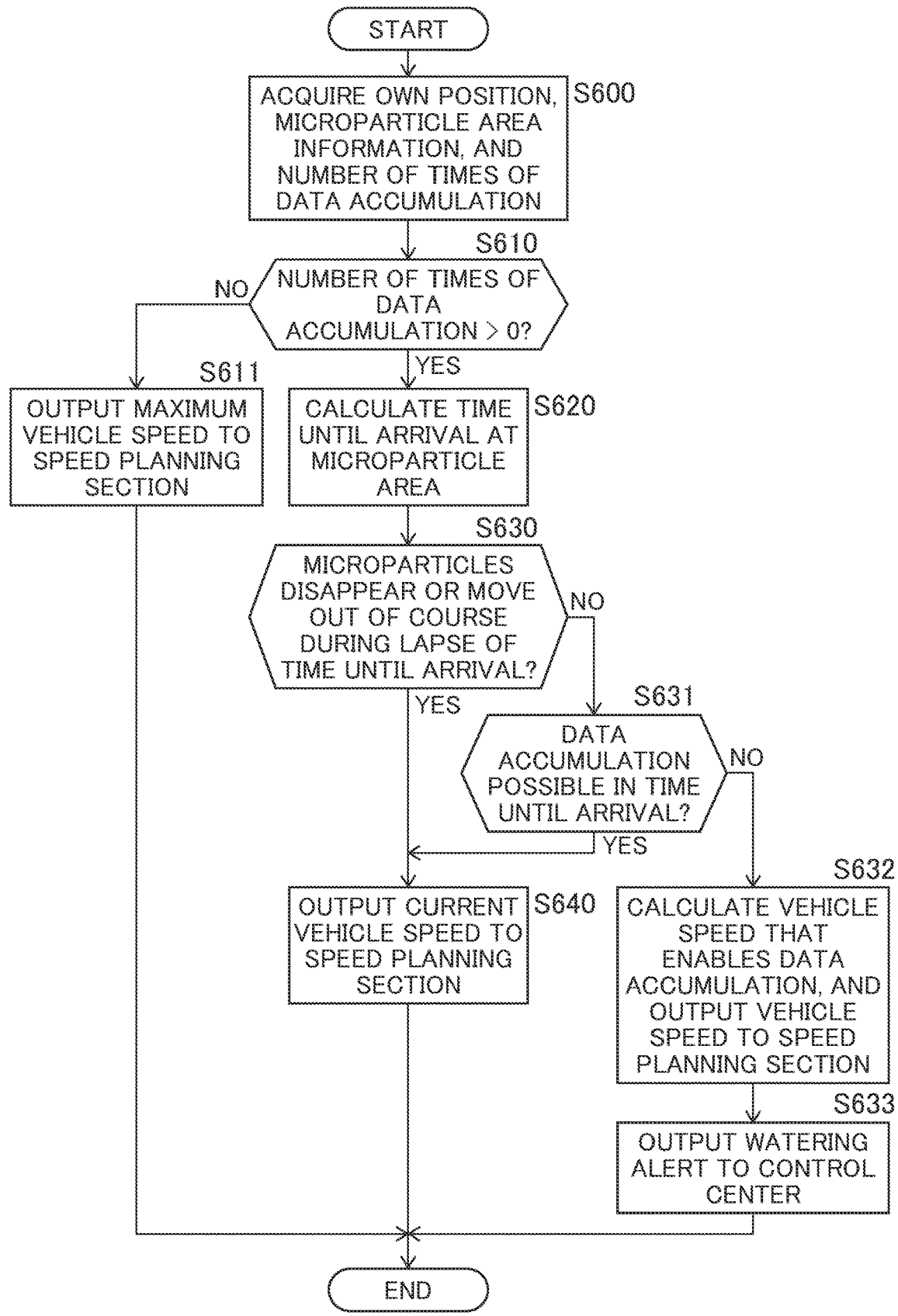
FIG. 11 is a flowchart depicting the content of processing by a vehicle action change determining section.

FIG. 11 is a flowchart depicting the content of processing by the vehicle action change determining section.

As depicted in FIG. 11, first, the vehicle action change determining section 350 acquires information about its own position and vehicle speed from the own-position estimating section 310, time-series information about the position, range, and density of a microparticle area from the microparticle sensing section 120, and the number of times of data accumulation from the microparticle deleting section 130 (Step S600), and decides whether or not the number of times of data accumulation is greater than "0" (zero) (Step S610).

When the result of the decision at Step S610 is NO, that is, when the number of times of data accumulation is "0," the maximum speed of the dump truck 200 is output to the speed planning section 320 (Step S611), and the process is ended.

In addition, when the result of the decision at Step S610 is YES, that is, when the number of times of data accumulation is greater than "0," on the basis of a rectangular parallelepiped determined from the information about the position and range of the scattering area, and the position and vehicle speed of the own vehicle, a surface of the rectangular parallelepiped closest to the vehicle body, and the distance to the own vehicle position are calculated, and time that elapses until arrival of the vehicle body is calculated from the distance and the vehicle speed (Step S620).

Next, the position, range, and density of the scattering area after a lapse of the time until arrival is estimated by using an estimation technique such as the known Kalman filter on the time-series data of the microparticle area, and it is decided whether or not the microparticle scattering area disappears or moves out of the course of the dump truck 200 during a lapse of the time until arrival (Step S630).

At Step S630, by deciding whether or not the density of the scattering area on the course of the dump truck 200 is lower than a predetermined threshold (threshold 5), it is decided whether or not the microparticle scattering area disappears or moves out of the course of the dump truck 200 during a lapse of the time until arrival.

Figure 12:
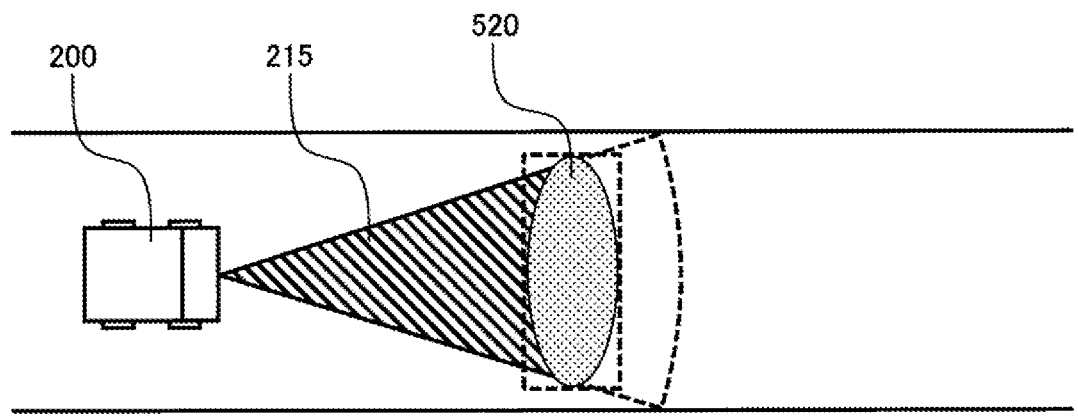
FIG. 12 is a figure illustrating, as an example, how a time-series estimation result of a microparticle scattering area appears.
Figure 13:
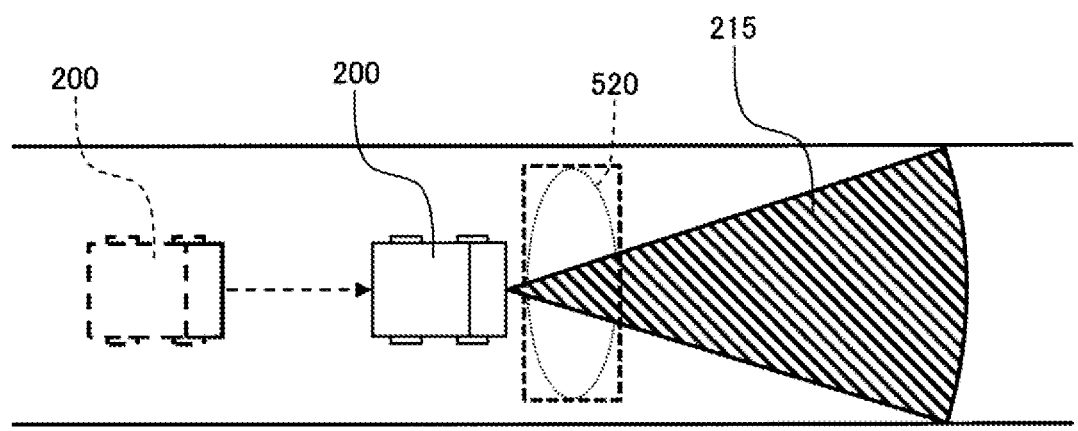
FIG. 13 is a figure illustrating, as an example, how a time-series estimation result of a microparticle scattering area appears.
Figure 14:
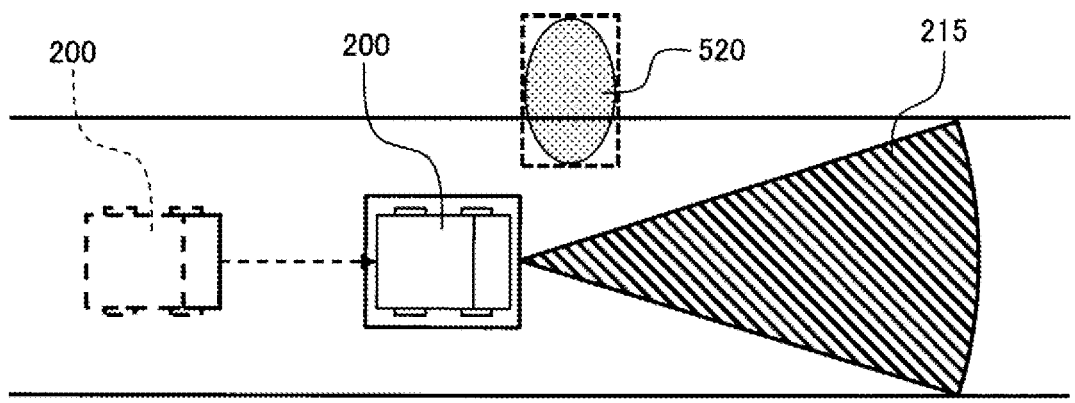
FIG. 14 is a figure illustrating, as an example, how a time-series estimation result of a microparticle scattering area appears.

FIG. 12 to FIG. 14 are figures illustrating, as examples, how time-series estimation results of a microparticle scattering area appear.

At Step S630, regarding a microparticle scattering area whose initial state is like the one depicted in FIG. 12, a determination is made whether the density lowers in an estimation result after a lapse of the time until arrival to be a value smaller than the threshold 5 as depicted in FIG. 13 or whether, the position and range of the scattering area changes and, a rectangular parallelepiped representing the scattering area and a rectangular parallelepiped area that is set so as to surround the vehicle do not contact each other, that is, the scattering area moves out of the course of the own vehicle as depicted in FIG. 14.

Note that the threshold 5 is the value of the highest density of densities of microparticle scattering areas calculated by the microparticle sensing section 120 when the number of times of data accumulation at the microparticle deleting section 130 becomes "0" (zero) in experiments implemented in advance in which the object sensor 100 performs measurements of microparticles that are generated at different densities.

When the result of the decision at Step S630 is YES, that is, when it is determined that the scattering area disappears or moves out, the current vehicle speed is output to the speed planning section 320 (Step S640), and the process is ended.

In addition, when the result of the decision at Step S630 is NO, the time until arrival at the scattering area calculated at Step S620, and time obtained by multiplying the number of times of accumulation and the measurement time of the environment recognition sensor 210 together are compared with each other to thereby decide whether the environment recognition sensor 210 can perform measurements a number of times necessary for data accumulation (Step S631). The measurement time of the environment recognition sensor 210 is a value unique to a sensor used.

When the result of the decision at Step S631 is YES, a signal representing the current vehicle speed is output to the speed planning section 320 (Step S640), and the process is ended.

In addition, when the result of the decision at Step S631 is NO, a vehicle speed that enables measurements is calculated by dividing the distance between the scattering area and the own vehicle calculated at Step S620 by the time obtained by multiplying the number of times of data accumulation and the measurement time together, the vehicle speed is output to the speed planning section 320 (Step S632), a watering alert is output to the control center 400 through the communication section 340 in order to prevent occurrence of decelerations of following vehicles, and further deterioration of the productivity (Step S633), and the process is ended.

Effects and advantages in the thus-configured present embodiment are explained.

The dump truck 200 includes the object sensor 100, the environment recognition sensor 210, the vehicle-mounted sensor 220, the vehicle controller 300, and the control center 400 that manages operation of the dump truck 200. The environment recognition sensor 210 performs measurements of the environment around the own vehicle, and outputs the point cloud data 215 to the object sensor 100. The object sensor 100 calculates information about the position, shape, movement speed, and movement direction of an object positioned around the own vehicle, and outputs the information to the vehicle controller 300. In addition, the object sensor 100 outputs, to the vehicle controller 300, a microparticle scattering situation calculated by the microparticle sensing section 120, and point cloud deficiency information calculated by the microparticle deleting section 130. The vehicle-mounted sensor 220 measures the position and posture of the own vehicle, and transmits the position and posture to the vehicle controller 300. The control center 400 outputs operation management information to the vehicle controller 300. The vehicle controller 300 decides the speed and steering angle of the vehicle such that object sensing can be implemented surely, on the basis of the operation management information received from the control center 400, information about its own position and vehicle posture acquired from the vehicle-mounted sensor 220, and object information and microparticle information acquired from the object sensor 100, and outputs the speed and steering angle to an actuator. Accordingly, even if microparticles are generated, the dump truck 200 can travel without colliding with an object around the vehicle by sensing the object without sensing failures or sensing errors.

In addition, the vehicle action change determining section 350 acquires information about its own position and vehicle speed from the own-position estimating section 310, time-series information about the position, range and density of the microparticle area from the microparticle sensing section 120, and the number of times of data accumulation from the microparticle deleting section 130, and calculates the time until arrival at the microparticle scattering area from the current position, the vehicle speed and the position and range of the microparticle area. Next, the situation of the microparticle area after a lapse of the time until arrival is estimated by using an estimation technique such as the known Kalman filter on the time-series data of the microparticle area. When it is determined, as a result of the estimation, that the microparticle area disappears or moves out of the course, the speed planning section 320 outputs such a signal that the current speed is maintained. In addition, when it is determined that the microparticle area remains on the course, it is determined whether data accumulation is possible before a lapse of the time until arrival on the basis of the measurement time of the environment recognition sensor 210 and the number of times of data accumulation, and, when the accumulation is possible, a signal for maintaining the current speed is output to the speed planning section 320. When it is determined that the accumulation is not possible, a vehicle speed is decided on the basis of time necessary for the data accumulation, and the distance from the current position to the microparticle area, and the vehicle speed is output to the speed planning section 320. Accordingly, sensing failures and sensing errors in object sensing due to the influence of microparticles can be avoided.

In addition, the vehicle action change determining section 350, when the vehicle speed is transmitted to the speed planning section 320, transmits a watering alert to the control center 400, and therefore can prevent further occurrence of microparticles.

Modification Example of First Embodiment

Note that whereas in a case where the vehicle action change determining section 350 determines that data accumulation is not possible by using time-series information about a microparticle scattering area, the number of times of data accumulation, its own position, and the vehicle speed, the vehicle speed is reduced in the case illustrated as an example in the first embodiment, this is not the sole example, and there are processes other than speed reduction that can be performed in a case where data accumulation is not possible.

For example, when, as a result of estimation of the position and range of the microparticle area after a lapse of the time until arrival at the microparticle scattering area, there are some microparticles on the course, the distances between each vertex of the rectangular parallelepiped representing the scattering area and shoulders on both sides on a road where the vehicle is travelling are calculated, and when it is determined that there is a space which is equal to or greater than the width of the vehicle body between the vehicle body and either shoulder, a trajectory to avoid the microparticle area may be output to the trajectory planning section 330. At this time, the positions of the shoulders may be acquired from map information retained by the control center 400, or the farthest object from the position of the own vehicle in a direction perpendicular to the vehicle advancing direction may be identified as a shoulder on the basis of information about positions and shapes obtained by sensing of objects sensed by the object sensor 100, and the information about the position and shape of the object may be used. In that case, since the vehicle can travel through a safe area where there are no microparticle areas by travelling on a trajectory received at the trajectory planning section 330, sensing failures and sensing errors in object sensing due to the influence of microparticles can be avoided.

Second Embodiment

A second embodiment of the present invention is explained with reference to FIG. 15 to FIG. 17.

The present embodiment depicts autonomous travelling control of two work machines (dump trucks) each including the object sensor 100.

Figure 15:
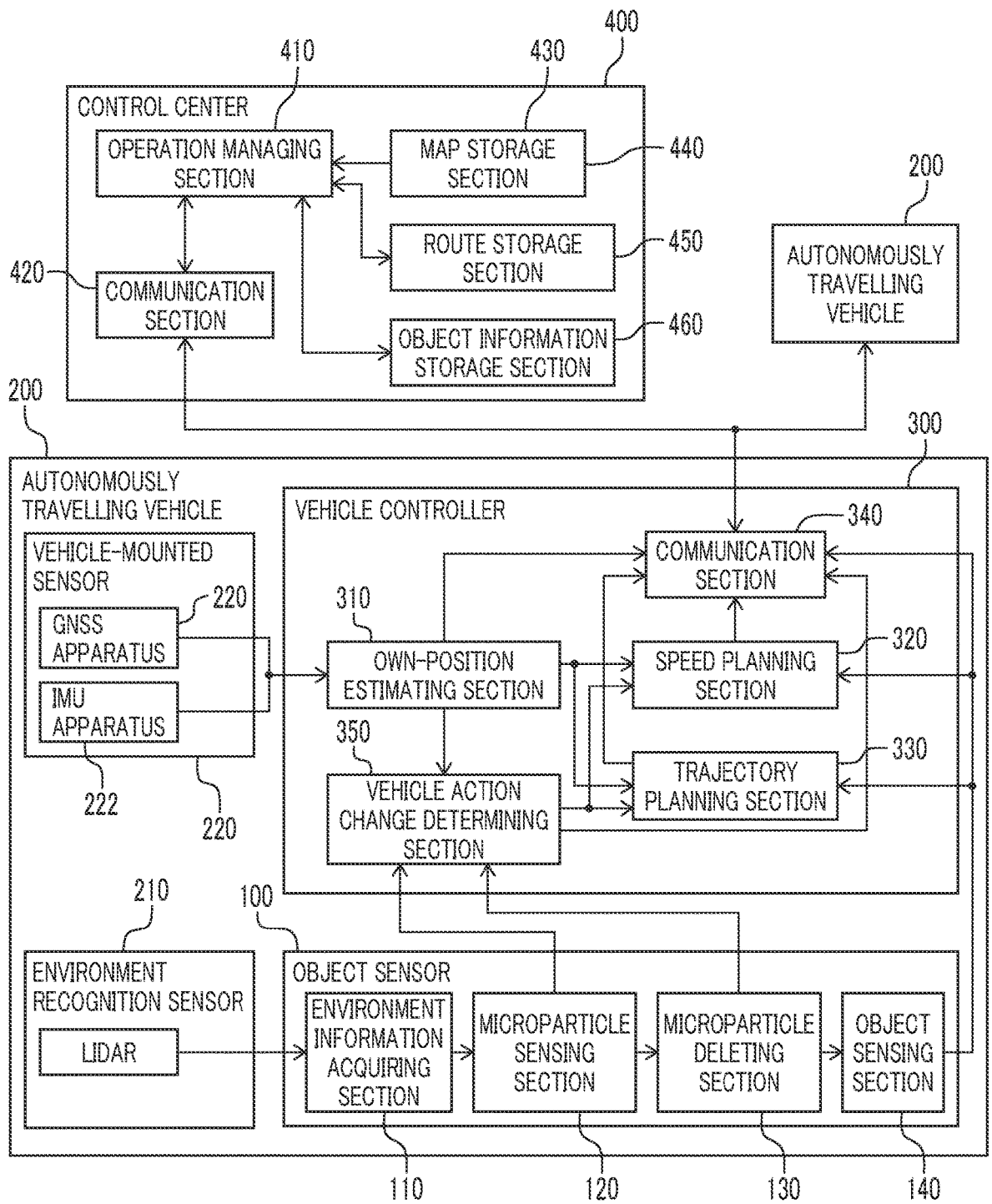
FIG. 15 is a functional block diagram schematically depicting, along with related constituent elements, processing functionalities of a dump truck on which the object sensor according to a second embodiment is mounted.

FIG. 15 is a functional block diagram schematically depicting, along with related constituent elements, processing functionalities of a dump truck on which the object sensor according to the present embodiment is mounted. In the figure, constituent elements having their counterparts in the first embodiment are given the same reference characters, and explanations thereof are omitted.

In FIG. 15, the dump truck 200 includes the object sensor 100, the environment recognition sensor 210, the vehicle-mounted sensor 220, the vehicle controller 300, and the control center 400 that manages operation of the dump truck 200.

The environment recognition sensor 210 performs measurements of the environment around the own vehicle, and outputs the point cloud data 215 to the object sensor 100.

The object sensor 100 calculates information about the position, size, shape, movement speed, and movement direction of an object positioned around the own vehicle, and outputs the information to the vehicle controller 300, and to the control center 400 by using the communication section 340 in the vehicle controller 300. In addition, the object sensor 100 outputs, to the vehicle controller 300, the position, range, and density of the microparticle scattering area calculated by the microparticle sensing section 120, and the number of times of accumulation of point clouds calculated by the microparticle deleting section 130.

The vehicle-mounted sensor 220 measures the position and posture of the own vehicle, and transmits the position and posture to the vehicle controller 300.

The control center 400 receives information about the position and vehicle speed of each vehicle, and the position, shape, movement speed, and movement direction of an object, stores the object information, decides a travel route and a target speed of each vehicle, and outputs object information, a travel route, and a target vehicle speed of a preceding vehicle to the vehicle controller 300 of each vehicle.

The vehicle controller 300 acquires: the travel route and target speed received from the control center 400; an object sensing result of an autonomously travelling vehicle 201; information about its own position and vehicle posture acquired from the vehicle-mounted sensor 220; time-series information about the position, shape, movement speed, and movement direction of an object around the own vehicle acquired from the object sensor 100; and time-series information about the position, range, and density of a microparticle scattering area. On the basis of the object sensing result of the preceding vehicle, it is determined whether object sensing is necessary. When object sensing is necessary, a speed and a steering angle of the vehicle are decided such that object sensing can be implemented surely on the basis of microparticle information, and are output to an actuator.

The configuration of the autonomously travelling vehicle 201 in the present embodiment is the same as that of the dump truck 200, and an explanation thereof is omitted.

Note that whereas two autonomously travelling vehicles (dump trucks 200 and 201) are depicted in the explanation in the present embodiment, this is not the sole example, and the present invention can be applied also to a case where three or more autonomously travelling vehicles travel on the same route. In addition, preceding vehicles are not necessarily limited to autonomously travelling vehicles, but may be any vehicles controlled by humans as long as they are work machines on which the object sensors 100 are mounted.

In the present embodiment, LiDARs are used as the environment recognition sensor 210. In addition, the environment recognition sensor 210 includes a front LiDAR 218 that mainly performs measurements in the front direction of the vehicle, and a rear LiDAR 219 that mainly performs measurements in the rear direction of the vehicle. It should be noted that there are no restrictions regarding installation positions and the number of installed front LiDARs and rear LiDARs as long as they can perform measurements on the course in front of and behind the vehicle.

The object sensing section 140 of the object sensor 100 outputs information about the position, shape, movement direction, and movement speed of an object on the course in front of and behind the vehicle to the speed planning section 320, the trajectory planning section 330, and the communication section 340 (the process corresponding to S530 in FIG. 10 in the first embodiment). Other processes are similar to their counterpart processes performed by the object sensor 100 in the first embodiment.

Next, the content of processing by the control center 400 is explained. The control center 400 acquires positional information and object information from the communication sections 340 of a plurality of dump trucks 200 by the communication section 420, and outputs them to the operation managing section 410. The operation managing section 410 outputs, to an object information storage section 450, the acquired object information, and an ID number of a vehicle body that has transmitted the object information. A target speed and a travel route of each vehicle are calculated by using the acquired positional information about each vehicle, map information acquired from the map storage section 430, and route information acquired from the route storage section 440. Then, the decided target speed and travel route are output to the dump truck 200 through the communication section 420. In addition, by superimposing positional information about each vehicle and a map, the positional relation of vehicles is grasped, and object information with a number corresponding to the autonomously travelling vehicle 201 travelling in front of the dump truck 200 is acquired from the object information storage section 450, and is output to the dump truck 200 through the communication section 420.

Next, the content of processing by the vehicle controller 300 is explained.

The communication section 340 receives a target speed and a travel route from the control center 400. The communication section 340 outputs the received target speed to the speed planning section 320, and outputs the received travel route to the trajectory planning section 330. The own-position estimating section 310 estimates the current position and speed of the vehicle by using positional data acquired from the vehicle-mounted sensor 220 and postural data, and outputs the current position and speed to the speed planning section 320, the trajectory planning section 330, and the vehicle action change determining section 350. The vehicle action change determining section 350 acquires information about the position, range, and density of a microparticle scattering area from the microparticle sensing section 120, the number of times of data accumulation from the microparticle deleting section 130, the current position and vehicle speed from the own-position estimating section 310, and information about the position, shape, movement speed, and movement direction of an object sensed by the autonomously travelling vehicle 201 which is a preceding vehicle from the communication section 340. When there are no objects sensed by the autonomously travelling vehicle 201, the process is ended without further processes. When there is information about an object sensed at the autonomously travelling vehicle 201, operation similar to that in the second embodiment is implemented. Details of processes by the vehicle action change determining section 350 are mentioned later. The speed planning section 320 decides an operation amount of an actuator on the basis of the target speed and current speed acquired from the communication section 340 and the vehicle speed acquired from the vehicle action change determining section 350. The trajectory planning section 330 decides a target trajectory on the basis of information about the travel route, the current position, and objects around the vehicle, and computes such a steering angle that travelling along the trajectory becomes possible.

Next, the content of processing by the vehicle action change determining section 350 is explained.

Figure 16:
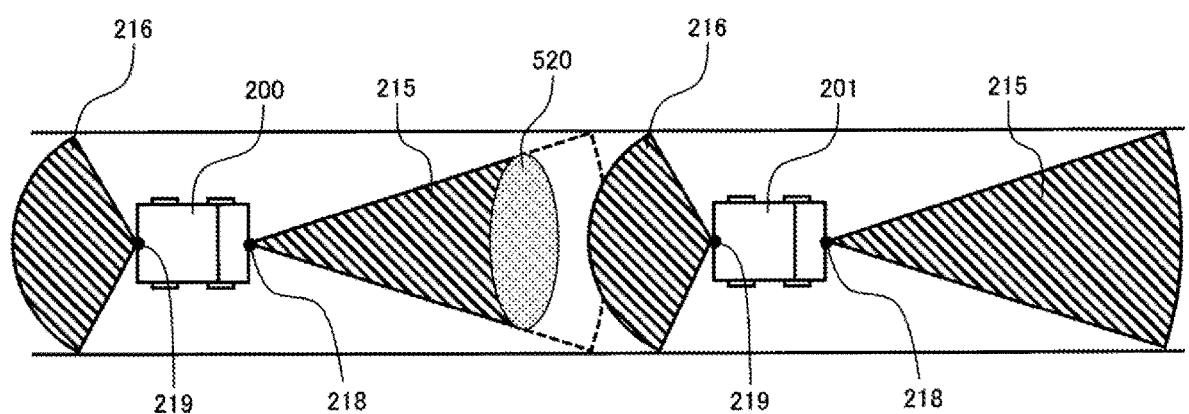
FIG. 16 is a figure depicting an example of a result of object sensing by a preceding vehicle.

FIG. 16 is a figure depicting an example of a result of object sensing by a preceding vehicle. In the case explained as an example with reference to FIG. 16, dust 520 occurs on the course after the autonomously travelling vehicle 201 passes, and the point cloud data 215 after processing by the microparticle deleting section 130 of the dump truck 200 does not have a sufficient data count necessary for object sensing.

Figure 17:
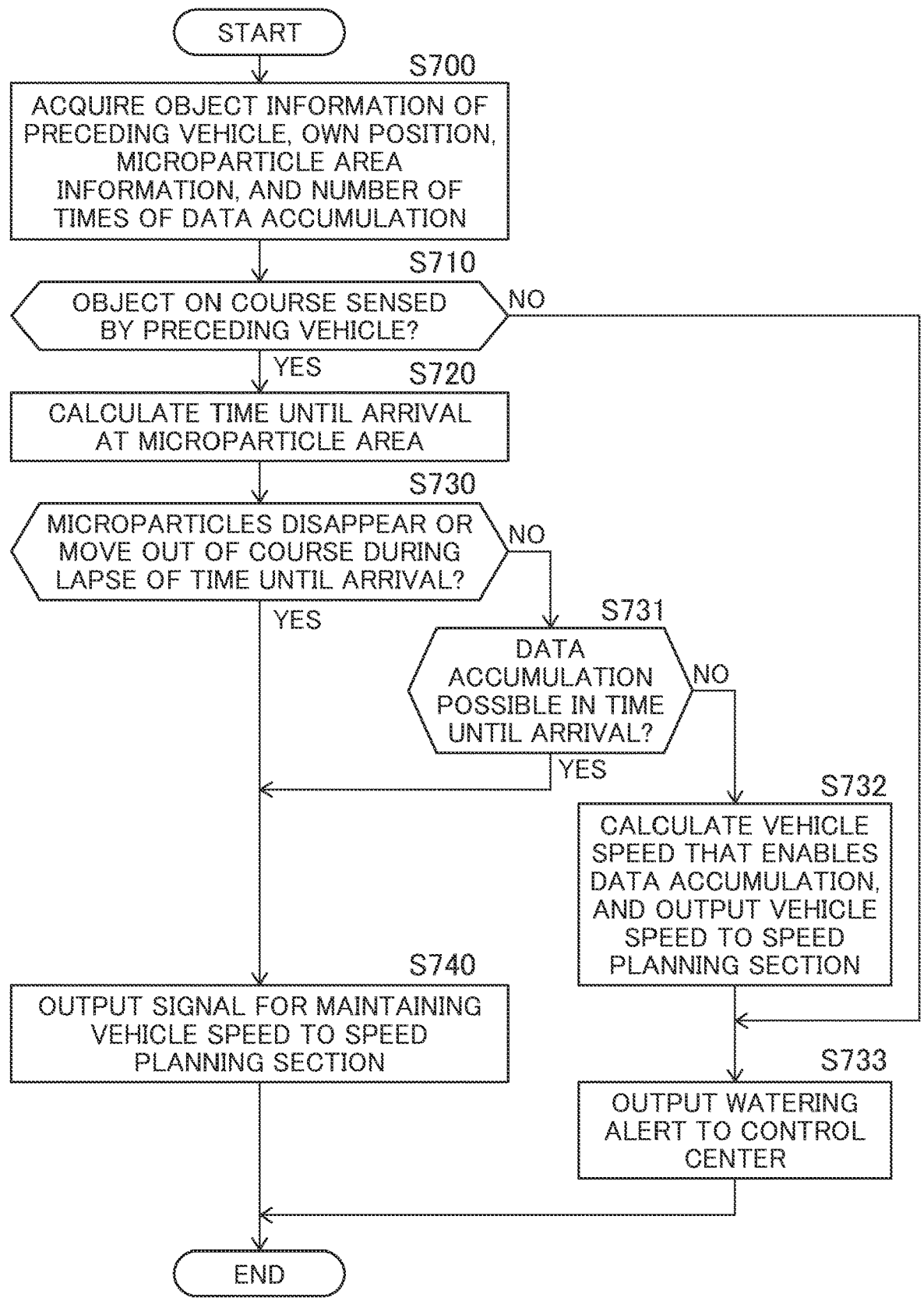
FIG. 17 is a flowchart depicting the content of processing by the vehicle action change determining section.

In addition, FIG. 17 is a flowchart depicting the content of processing by the vehicle action change determining section. Note that, in FIG. 17, In FIG. 17, first, the vehicle action change determining section 350 acquires an object sensing result of the autonomously travelling vehicle 201 from the control center 400, information about its own position and vehicle speed from the own-position estimating section 310, time-series information about the position, range and density of a microparticle area from the microparticle sensing section 120, and the number of times of data accumulation from the microparticle deleting section 130 (Step S700), and decides whether or not there is an object on the course in front of and behind the autonomously travelling vehicle 201 on the basis of the object sensing result of the autonomously travelling vehicle 201 which is a preceding vehicle acquired from the control center 400 (Step S710).

When the result of the decision at Step S710 is YES, that is, when it is decided that there is an object on the course, on the basis of a rectangular parallelepiped determined from the information about the position and range of the scattering area, and the position and vehicle speed of the own vehicle, a surface of the rectangular parallelepiped closest to the vehicle body, and the distance to the own vehicle position are calculated, and time that elapses until arrival of the vehicle body is calculated from the distance and the vehicle speed (Step S720).

Next, the position, range, and density of the scattering area after a lapse of the time until arrival is estimated by using an estimation technique such as the known Kalman filter on the time-series data of the microparticle area, and it is decided whether or not the microparticle scattering area disappears or moves out of the course of the dump truck 200 during a lapse of the time until arrival (Step S730).

At Step S730, by deciding whether or not the density of the scattering area on the course of the dump truck 200 is lower than the predetermined threshold (threshold 5), it is decided whether or not the microparticle scattering area disappears or moves out of the course of the dump truck 200 during a lapse of the time until arrival (see Step S630 in FIG. 11 in the first embodiment).

When the result of the decision at Step S730 is YES, that is, when it is determined that the scattering area disappears or moves out, a signal representing the current vehicle speed is output to the speed planning section 320 (Step S740), and the process is ended.

In addition, when the result of the decision at Step S730 is NO, the time until arrival at the scattering area calculated at Step S720, and time obtained by multiplying the number of times of accumulation and the measurement time of the environment recognition sensor 210 together are compared with each other to thereby decide whether the environment recognition sensor 210 can perform measurements the number of times necessary for data accumulation (Step S731). The measurement time of the environment recognition sensor 210 is a value unique to a sensor used.

When the result of the decision at Step S731 is YES, a signal representing the current vehicle speed is output to the speed planning section 320 (Step S740), and the process is ended.

In addition, when the result of the decision at Step S731 is NO, a vehicle speed that enables measurements is calculated by dividing the distance between the scattering area and the own vehicle calculated at Step S720 by the time obtained by multiplying the number of times of data accumulation and the measurement time together, the vehicle speed is output to the speed planning section 320 (Step S732), a watering alert is output to the control center 400 through the communication section 340 in order to prevent occurrence of decelerations of following vehicles, and further deterioration of the productivity (Step S733), and the process is ended.

In addition, when the result of the decision at Step S710 is NO, that is, when it is decided that there are no objects on the route of the dump truck 200, a watering alert is output to the control center 400 through the communication section 340 in order to prevent occurrence of decelerations of following vehicles, and further deterioration of the productivity (Step S733), and the process is ended.

In other respects, the configuration is similar to that in the first embodiment.

In the thus-configured present embodiment also, advantages similar to those attained by the first embodiment can be attained.

In addition, the dump truck 200 includes the object sensor 100, the environment recognition sensor 210, the vehicle-mounted sensor 220, the vehicle controller 300, and the control center 400 that manages operation of the dump truck 200. The environment recognition sensor 210 performs measurements of the environment around the own vehicle, and outputs the point cloud data 215 to the object sensor 100. The object sensor 100 calculates information about the position, size, shape, movement speed, and movement direction of an object positioned around the own vehicle, and outputs the information to the vehicle controller 300, and to the control center 400 by using the communication section 340 in the vehicle controller 300. In addition, the object sensor 100 outputs, to the vehicle controller 300, the position, range and density of the microparticle scattering area calculated by the microparticle sensing section 120, and the number of times of accumulation of point clouds calculated by the microparticle deleting section 130. The vehicle-mounted sensor 220 measures the position and posture of the own vehicle, and transmits the position and posture to the vehicle controller 300. The control center 400 receives information about the position and vehicle speed of each vehicle, and the position, shape, movement speed, and movement direction of an object, stores the object information, decides a travel route and a target speed of each vehicle, and outputs object information, a travel route, and a target vehicle speed of a preceding vehicle to the vehicle controller 300 of each vehicle. The vehicle controller 300 acquires: the travel route and target speed received from the control center 400; an object sensing result of the autonomously travelling vehicle 201; information about its own position and vehicle posture acquired from the vehicle-mounted sensor 220; time-series information about the position, shape, movement speed, and movement direction of an object around the own vehicle acquired from the object sensor 100; and time-series information about the position, range, and density of a microparticle scattering area. On the basis of the object sensing result of the preceding vehicle, it is determined whether object sensing is necessary. When object sensing is necessary, a speed and a steering angle of the vehicle are decided such that object sensing can be implemented surely on the basis of microparticle information, and are output to an actuator. Accordingly, the dump truck 200 can travel without deterioration of the productivity even if microparticles are generated.

In addition, the vehicle action change determining section 350, when there are no objects on the basis of object sensing information of the preceding vehicle, ends the process without reducing the vehicle speed.

Accordingly, when it is guaranteed that there are no objects on the course, the dump truck 200 can pass through the microparticle scattering area without reducing the speed, and therefore deterioration of the productivity can be prevented.

Additional Notes

Note that the present invention is not limited to the embodiments described above, but includes various modification examples. For example, the embodiments described above are explained in detail in order to explain the present invention in an easy-to-understand manner, and the present invention is not necessarily limited to embodiments including all the constituent elements explained. Other aspects that can be conceived within the scope of the technical ideas of the present invention are also included in the scope of the present invention. In addition, some of the constituent elements of an embodiment can be replaced with constituent elements of another embodiment, and also constituent elements of an embodiment can also be added to the constituent elements of another embodiment. In addition, some of the constituent elements of each embodiment can additionally have other constituent elements, can be deleted, or can be replaced with other constituent elements. In addition, some or all of the constituent elements, functionalities, processing sections, processing means, and the like described above may be realized by hardware by, for example, designing them in an integrated circuit, and so on. In addition, constituent elements, functionalities, and the like described above may be realized by software by a processor interpreting and executing a program to realize respective functionalities. Information such as a program, a table, or a file to realize each functionality can be stored on a recording apparatus such as a memory, a hard disk, or an SSD (Solid State Drive) or a recording medium such as an IC card, an SD card, or a DVD.

DESCRIPTION OF REFERENCE CHARACTERS

100: Object sensor
110: Environment information acquiring section
120: Microparticle sensing section
130: Microparticle deleting section
140: Object sensing section
200: Dump truck (work machine, autonomously travelling vehicle)
201: Dump truck
210: Environment recognition sensor
220: Vehicle-mounted sensor
221: GPS apparatus
222: IMU device
300: Vehicle controller
310: Own-position estimating section
320: Speed planning section
330: Trajectory planning section
340: Communication section
350: Vehicle action change determining section
400: Control center
410: Operation managing section
420: Communication section
430: Map storage section
440: Route storage section
450: Object information storage section
500: Object
510: Ground
520: Dust
218: Front LiDAR
219: Rear LiDAR

The invention claimed is:

1. A work machine that operates at a site, the work machine comprising:
 a measurement sensor that measures, a three-dimensional point cloud information constituted of a plurality of pieces of point data indicating a surface position of an object around the work machine;
 an object sensor that senses the object as a sensing subject around the work machine on a basis of information from the measurement sensor;
 a vehicle controller that performs autonomous travelling control of the work machine at the site of the work machine;
 a position measurement sensor that measures a position of the work machine; and
 a posture measurement sensor that measures a posture of the work machine, wherein
 the object sensor configured to:
 acquire the three-dimensional point cloud information obtained as a result of measurement by the measurement sensor,
 sense point data as microparticles, based on a relationship between a depression angle determined based on a horizontal direction from the measurement sensor and a measurement distance from the measurement sensor of point data of a vertically-adjacent surface position of the object, and variances of distance differences from the measurement sensor,
 delete the point data of a point sensed as the point where the microparticles are measured, from the three-dimensional point cloud information,
 sense the object around the work machine on a basis of the three-dimensional point cloud information from which microparticle point data has been deleted, and
 when a point data count included in the three-dimensional point cloud information from which microparticle point data has been deleted is smaller than a predetermined threshold, decide that the point data count is not sufficient for object sensing, and perform an accumulation of the point data until the point data count of the three-dimensional point cloud information becomes equal to or greater than the predetermined threshold, and
 the vehicle controller is configured to:
 control the autonomous travelling of the work machine on a basis of a sensing result of the object sensor, and
 determine whether or not a microparticle scattering area is no longer present on a travel trajectory of the work machine before the work machine arrives at the scattering area, by using information about a position and a movement speed of the work machine calculated on a basis of a measurement result of the position measurement sensor, the sensing result of the microparticles obtained from the object sensor, and information about a number of times of the accumulation of point data.

2. The work machine according to claim 1, wherein the vehicle controller is configured to, when it is determined that there is the microparticle scattering area on the travel trajectory of the work machine before the work machine at a current movement speed arrives at the microparticle scattering area, and additionally the point data count of the three-dimensional point cloud information from which microparticle point data has been deleted is smaller than the predetermined threshold, reduce a movement speed of the work machine such that point data of the three-dimensional point cloud information is accumulated, and the point data count of the three-dimensional point cloud information becomes equal to or greater than the predetermined threshold before the work machine arrives at the microparticle scattering area, when it is determined that there is the microparticle scattering area on the travel trajectory of the work machine before the work machine at a current movement speed arrives at the microparticle scattering area.

3. The work machine according to claim 1, wherein the vehicle controller is configured to change the travel trajectory of the work machine such that the work machine avoids the microparticle scattering area, when it is determined that there is the microparticle scattering area on the travel trajectory of the work machine until the work machine at a current movement speed arrives at the microparticle scattering area, additionally a microparticle scattering density of the scattering area is higher than the predetermined threshold, and additionally the point data count of the three-dimensional point cloud information accumulated until a time point when the work machine at the current movement speed arrives at the scattering area is smaller than the predetermined threshold.

4. The work machine according to claim 1, wherein the vehicle controller is configured to set the travel trajectory of the work machine such that the work machine passes through the microparticle scattering area when, according to a sensing result of the object sensor of a preceding work machine travelling in front of the work machine on a same travel trajectory acquired from a control center, an object is not sensed in the microparticle scattering area and an area behind the microparticle scattering area.

* * * * *